US011124598B2

United States Patent
Bunzen et al.

(10) Patent No.: US 11,124,598 B2
(45) Date of Patent: Sep. 21, 2021

(54) METHOD FOR PRODUCING A TEMPOL-CONTAINING URETHANE RESIN COMPOSITION HAVING AN IMPROVED STORAGE STABILITY

(71) Applicant: Hilti Aktiengesellschaft, Schaan (LI)

(72) Inventors: Jens Bunzen, Augsburg (DE); Anna Sharmak, Augsburg (DE); Robert Dölle, Schwabmuenchen (DE); Astrid Buder, Kaufering (DE); Thomas Bürgel, Landsberg (DE); Beate Gnass, Gersthofen (DE); Philipp Wieland, Munich (DE); Sascha Dierker, Merching (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/625,001

(22) PCT Filed: Jul. 2, 2018

(86) PCT No.: PCT/EP2018/067736
§ 371 (c)(1),
(2) Date: Dec. 20, 2019

(87) PCT Pub. No.: WO2019/011684
PCT Pub. Date: Jan. 17, 2019

(65) Prior Publication Data
US 2020/0140602 A1 May 7, 2020

(30) Foreign Application Priority Data

Jul. 10, 2017 (EP) .................................... 17180472

(51) Int. Cl.
*C08G 18/67* (2006.01)
*C04B 26/06* (2006.01)
*C04B 26/16* (2006.01)
*C04B 28/04* (2006.01)
*C08F 290/06* (2006.01)
*C08G 18/24* (2006.01)
*C08G 18/76* (2006.01)
*C08J 3/22* (2006.01)
*C08K 5/34* (2006.01)
*C08K 5/54* (2006.01)
*C08K 5/3415* (2006.01)
*C08K 5/3435* (2006.01)
*C08K 5/5415* (2006.01)
*C04B 111/00* (2006.01)

(52) U.S. Cl.
CPC ............ *C08G 18/672* (2013.01); *C04B 26/06* (2013.01); *C04B 26/16* (2013.01); *C04B 28/04* (2013.01); *C08F 290/067* (2013.01); *C08G 18/242* (2013.01); *C08G 18/7664* (2013.01); *C08J 3/22* (2013.01); *C08K 5/3415* (2013.01); *C08K 5/3435* (2013.01); *C08K 5/5415* (2013.01); *C04B 2111/0075* (2013.01); *C04B 2111/00715* (2013.01); *C08J 2375/14* (2013.01)

(58) Field of Classification Search
CPC ................ C08G 18/672; C08G 18/242; C08G 18/7664; C04B 26/06; C04B 26/16; C04B 28/04; C04B 2111/00715; C04B 2111/0075; C08F 290/067; C08J 3/22; C08J 2375/14; C08K 5/3415; C08K 5/3435; C08K 5/5415
USPC .......................................................... 524/2
See application file for complete search history.

(56) References Cited

U.S. PATENT DOCUMENTS

| | | | |
|---|---|---|---|
| 5,854,305 A * | 12/1998 | Schwiegk | C08L 63/10 523/130 |
| 7,166,670 B2 | 1/2007 | Udding et al. | |
| 7,759,405 B2 | 7/2010 | Hong et al. | |
| 9,463,449 B2 | 10/2016 | Buergel | |
| 10,501,372 B2 | 12/2019 | Sharmak et al. | |
| 2004/0068044 A1 | 4/2004 | Udding et al. | |
| 2008/0255264 A1 | 10/2008 | Hong et al. | |
| 2013/0112432 A1 | 5/2013 | Buergel | |
| 2015/0034243 A1 | 2/2015 | Haveman et al. | |
| 2015/0080501 A1 * | 3/2015 | Khalyavina | C08K 5/3435 524/5 |
| 2016/0083563 A1 | 3/2016 | Grun et al. | |
| 2018/0170808 A1 | 6/2018 | Sharmak et al. | |

FOREIGN PATENT DOCUMENTS

| | | | |
|---|---|---|---|
| CN | 1481400 | 3/2004 | |
| CN | 1878818 | 12/2006 | |
| CN | 101283065 | 8/2008 | |
| CN | 102050938 | 5/2011 | |
| CN | 102757532 | 10/2012 | |
| CN | 103582662 | 2/2014 | |
| CN | 105440658 | 3/2016 | |
| CN | 106414365 | 2/2017 | |
| DE | 195 31 649 | 3/1997 | |
| DE | 10 2010 013 198 | 9/2011 | |
| EP | 2 862 847 | 4/2015 | |
| EP | 2 862 899 | 4/2015 | |
| EP | 2862899 A1 * | 4/2015 | ............. C04B 26/16 |
| JP | 2001011328 | 1/2001 | |
| WO | 2013/156360 | 10/2013 | |

OTHER PUBLICATIONS

International Search Report dated Sep. 27, 2018 in PCT/EP2018/067736 with English translation (5 pages).
Written Opinion dated Sep. 27, 2018 in PCT/EP2018/067736.

* cited by examiner

*Primary Examiner* — Michael Bernshteyn
(74) *Attorney, Agent, or Firm* — Grüneberg and Myers PLLC

(57) ABSTRACT

A method is useful for producing a urethane(meth)acrylate resin composition. The method improves storage stability and reduces the reactivity drift of the composition compared to compositions made by other means from the same starting materials. In particular, it reduces the degradation of TEMPOL in mixtures with branched urethane resins.

17 Claims, 4 Drawing Sheets

METHOD FOR PRODUCING A TEMPOL-CONTAINING URETHANE RESIN COMPOSITION HAVING AN IMPROVED STORAGE STABILITY

CROSS-REFERENCE TO RELATED APPLICATIONS

This application is a National Stage entry under § 371 of International Application No. PCT/EP2018/067736, filed on Jul. 2, 2018, and which claims the benefit of European Application No. 17180472.7, filed on Jul. 10, 2017. The contents of each application are hereby incorporated by reference in their entirety.

BACKGROUND OF THE INVENTION

Field of the Invention

The present invention relates to a method for producing a urethane(meth)acrylate resin composition. The method improves storage stability and reduces the reactivity drift of the composition compared to compositions made by other means from the same starting materials. In particular, it reduces the degradation of TEMPOL in mixtures with branched urethane resins.

Discussion of the Background

The use of chemical fastening agents based on radically curable resins has long been known. In the field of fastening technology, the use of resins as an organic binder for the chemical fastening technology, for example, as part of a dowel mass, has prevailed. Such dowel masses are composite materials which are formulated as multicomponent systems, one component (the reactive resin component) containing the radically curable resin and the other component (the hardener component) containing an initiator (for radical formation). Other common ingredients such as additives, fillers, accelerators, stabilizers, solvents, and reactive diluents may be contained in one and/or the other component. By mixing the two components, the curing reaction, i.e. the polymerization, is initiated by radical formation and the resin is cured to obtain duromer.

Vinyl ester resins and in particular vinyl ester urethane resins are usually used as radically curable resins in conventional reactive resin components, said vinyl ester urethane resins being obtainable by reaction of monomeric, oligomeric or polymeric aromatic diisocyanates and hydroxy-substituted methacrylates, such as hydroxyalkyl methacrylate. EP 0713015 B1, for example, describes dowel compositions comprising unsaturated polyester resins, vinyl ester resins, including vinyl ester urethane resins, as radically curable resins. DE 102011017626 B4 also describes vinyl ester urethane resins.

DE 4111828 A1 describes a customary method for the preparation of vinyl ester urethane resins for chemical fastening technology. In the method, a prepolymeric diisocyanate based on 4,4'-diphenylmethyl diisocyanate is reacted at 50° C. with hydroxypropyl methacrylate in the presence of a catalyst. After addition of a further amount of catalyst, the reaction mixture is stirred at 70° C. for two hours.

If both the radically curable resins and the reactive resin components prepared therefrom are stored, precautions must be taken to prevent premature polymerization of the radically curable resins, which often results in gelling of the resins or compositions containing them. This is particularly important in the case of non-isolated resins and reactive resin components containing them which contain further constituents which may have an influence on the storage stability.

In addition to storage stability, the reactivity drift of resin compositions (such as reactive resins as defined herein, but also of reactive resins with additional inorganic fillers, e.g., the reactive resin components as defined herein) is a known problem that occurs when they are stored. It is often observed that after a certain period of storage, the resin reactivity has changed markedly over a longer period of time, such as a period of about two months. This change is called reactivity drift. As a rule, the resin reactivity decreases during storage, which means that the time span in which a reactive resin or a reactive resin component remains viscous and thus processable after addition of the initiator is shortened. The reactivity drift has an immediate effect on the processing time of the reactive resins or masses containing them so that the actual processing time is no longer consistent with the original processing time. The processing life of compositions with a reactivity drift is generally shorter. This is due to various causes, such as the purity of the starting materials for the synthesis of radically curable resins and/or the components of the compositions containing these resins and masses produced therefrom, which can interact or react with each other, as well as external influences during storage such as degradation of the inhibitors usually contained in reactive resins by elevated temperatures, light or oxidation.

For stabilization against premature polymerization, compositions which contain radically curable resins and which must last for a certain storage time (i.e., for example, reactive resin components as defined herein) usually contain inhibitors. Inhibitors used for stabilization against premature polymerization are also referred to in the art as stabilizers, while inhibitors for reducing reactivity drift are also referred to as inhibitors in the art. Often one and the same compound fulfills both functions, i.e. it is both a stabilizer for increasing the storage stability and an inhibitor of the reactivity drift.

Frequently used inhibitors are hydroquinone, substituted hydroquinones, phenothiazine, benzoquinone and tert-butylated pyrocatechol, as described for example in EP 1935860 A1 or EP 0965619 A1. These inhibitors give a reactive resin component a storage stability of several months, but usually only when stored in the absence of air. They are oxidized by atmospheric oxygen, which can result in reduced storage stability and a reactivity drift.

A stabilization of reactive resin components based on free-radically polymerizable resins could also be achieved with another type of inhibitor, namely with stable nitroxyl radicals, also called N-oxyl radicals, such as piperidinyl-N-oxyl or tetrahydropyrrole-N-oxyl, such as, for example, described in DE 19531649 A1. Therefore, at present, 4-hydroxy-2,2,6,6-tetramethylpiperidine-N-oxyl (hereinafter referred to as TEMPOL) is often used for stabilization when a reactive resin component is stored under exclusion of air. Some of the nitroxyl radicals, in particular TEMPOL, moreover have the property of delaying the polymerization after the addition of the initiator. This has the advantage that it also allows the resin reactivity to be adjusted. Whether these nitroxyl radicals, in addition to the stabilization of the radically curable resin, also causes the resin reactivity to change, depends on the concentration in which they are used.

It is known that the use of stable nitroxyl radicals of the piperidinyl-N-oxyl type, such as TEMPOL, or of the tetrahydropyrrole-N-oxyl-type can be a problem in compositions based on branched urethane(meth)acrylates prepared from polymeric methylene diphenyl diisocyanate (pMDI). The pMDI is the distillation bottoms from the distillative purification of methylene diphenyl diisocyanate (MDI) and consequently contains many impurities. Unlike distilled MDI, when stabilized with TEMPOL against premature polymerization, pMDI exhibits reduced storage stability, resulting in gelation and, in the worst case, curing of the resin. Moreover, compositions containing a backbone resin prepared from pMDI and having their reactivity adjusted with TEMPOL soon show an impairment of the set reactivity; there is an undesirable reactivity drift.

It is known, inter alia, from EP 1716204 A1 and EP 1716205 A1 that unsaturated polyester resin and vinyl ester resin compositions have a not insignificant reactivity drift, in particular after prolonged storage. Accordingly, EP 1716204 A1 proposes a method by which unsaturated polyester resin or vinyl ester resin compositions can be provided which have a significantly lower reactivity drift compared with the compositions obtainable by the hitherto known preparation methods. According to EP 1716205 A1, in addition to an aromatic amino compound, a nitroxyl radical can also be added. It will be apparent to those skilled in the art that in order to obtain a low reactivity drift composition containing an unsaturated polyester resin or vinyl ester resin, certain phenolic inhibitors and aromatic amino compounds used to adjust the resin reactivity must be added to the base resin in a particular order. It is considered critical to success that, first, by adding a particular phenolic inhibitor, a primary composition containing an unsaturated polyester resin or vinyl ester resin is provided, to which is then added an aromatic amino compound and optionally an additional nitroxyl radical. A disadvantage of the described compositions is that the reactivities continue to spread over a wide range after storage and that the reactivity drift, contrary to what is stated in these documents, is still quite high in some cases. Accordingly, the described methods have not been able to satisfactorily solve the problem of storage stability, in particular for compositions stored over a period of several months.

Inter alia, from DE 102011017626 A1, WO 2013/156358 A1, WO 2013/156356 A1 and WO 2013/156360 A1, it is known that unsaturated vinyl-ester resin compositions based on polymeric diphenylmethane diisocyanate (pMDI), which contain a nitroxyl radical as polymerization stabilizer, in particular for adjusting the resin reactivity, have a sometimes quite considerable reactivity drift, especially after prolonged storage. Accordingly, DE 102011017626 A1 proposes the addition of an organic nitrogen base or an alkali metal hydroxide, each dissolved in a solvent, in the preparation of the composition. The addition can be carried out before or after the addition of the stable nitroxyl radical. Although the desired storage stability can be achieved, the addition of the base, however, leads to an increase in the viscosity of a mortar containing the corresponding composition and to a shortening of the resin reactivity. It has also been observed that prolonged storage causes severe curing problems. The addition of base also has a negative impact on the manufacturing costs of compositions produced in this way.

A further possibility can be found in WO 2013/156358 A1, WO 2013/156356 A2 and WO 2013/156360 A1, which suggest the use of specific nitroxyl radicals as stabilizers. According to WO 2013/156358 A1, compositions based on radically curable resins (such as, for example, reactive resin components) can be rendered very stable on storage by the use of a stable indole nitroxide radical as stabilizer and/or inhibitor and the reactivity of inorganically filled reactive resin components can be adjusted in a targeted manner. A similar approach is proposed by WO 2013/156356 A1, according to which compositions based on radically curable resins (such as reactive resin components) are rendered very stable on storage by the use of a stable phosphorylated nitroxyl radical as stabilizer and/or inhibitor and the reactivity of inorganically filled reactive resin components can be adjusted in a targeted manner. For this purpose, WO 2013/156360 A1 proposes a combination of at least one stable nitroxyl radical and at least one quinone methide. However, the possibilities described have the disadvantage that the production costs of the compositions are in part significantly increased by the addition of the non-conventional inhibitors. In addition, an incompatibility of certain nitroxyl radicals with quinone methides was observed, which manifests itself in a reduction in storage stability and thus has exactly the effect that actually should be avoided by the use of quinone methides.

As in DE 4111828 A1, it is also described in DE 102011017626 A1, WO 2013/156356 A2, WO 2013/156358 A1 and WO 2013/156360 A1 that polymeric methylene diphenyl diisocyanate is reacted with hydroxypropyl methacrylate in the presence of a catalyst, wherein the internal temperature rises to 85° C.

There is still a need for pMDI-based reactive resins, in particular reactive resin components which are not immediately further processed but stored, due to their intended use such as for chemical fastening technology, which have improved storage stability and a relatively stable reactivity, i.e. their reactivity drift or gel time drift is reduced and preferably in a very narrow range, or in which no reactivity drift or gel time drift takes place.

SUMMARY OF THE INVENTION

This object is achieved by the method according to an embodiment below.

The inventors of the present invention were able to show that, surprisingly, the resin reactivity (i.e. the time until the resin cures after addition of the initiator) is prolonged upon the addition of the initiator, if the addition of TEMPOL is postponed when preparing a reactive resin based on a urethane methacrylate resin prepared from pMDI as backbone resin, relative to the time when the reaction to the backbone resin is completed. The TEMPOL is therefore not added according to the invention directly after completion of the reaction to the backbone resin, but only after a certain interval after this time, for example, after at least 4 hours. The extension of the resin reactivity achievable by the invention has the advantage that the reactive resin remains processable for longer after addition of the initiator.

In addition, the inventors were able to show that the reactivity drift and gel time drift can be reduced, if the addition of TEMPOL is postponed when preparing a reactive resin based on a urethane methacrylate resin prepared from pMDI as backbone resin, relative to the time when the reaction to the backbone resin is completed. The TEMPOL is therefore not added according to the invention directly after completion of the reaction to the backbone resin, but only after a certain interval after this time, for example, only after at least 4 hours. The reduction of the reactivity drift and the gel time drift has the advantage that the reactive resin has an increased storage stability.

In addition, the inventors have been able to show that, surprisingly, the storage stability can be increased and the reactivity drift or gel time drift can be reduced, when in the preparation of a composition based on a pMDI-based urethane(meth)acrylate resin, the synthesis of the urethane (meth)acrylate resin takes place at a higher temperature than is common in the synthesis of urethane(meth)acrylate resins. The person skilled in the art would usually strive to keep the temperature at which the isocyanate compound is reacted with the hydroxy-functionalized (meth)acrylate compound as low as possible in the synthesis of a urethane(meth) acrylate resin, since it is known that a too high temperature affects the storage stability negative and increases the risk of unwanted polymerization in the synthesis.

Further, the inventors have been able to show that higher temperature during post-reaction time (after completion of the reaction to urethane(meth)acrylate resin and before addition of TEMPOL) during which the batch is annealed also has a positive effect on gel time drift and storage stability.

Finally, the invention relates to a combination of these advantageous method guides, that is, a method in which a pMDI-based urethane(meth)acrylate is synthesized at an elevated temperature compared to conventional methods and then TEMPOL is added after a greater interval, compared to conventional methods, at the time of completion of the reaction and additionally advantageously added to the urethane(meth)acrylate at an increased temperature compared to conventional methods.

DETAILED DESCRIPTION OF THE INVENTION

The positive effect on storage stability is probably explained by the fact that TEMPOL acts both as a stabilizer and as an inhibitor. To achieve the effect as an inhibitor, a larger amount of TEMPOL is required than for a stabilizer effect. Thus, as shown here, the inhibiting amount of TEMPOL is degraded more slowly (resulting in an improved reactivity drift), which also has a positive effect on stabilization.

For better understanding of the invention, the following explanations of the method of producing a reactive resin and the terminology used herein are considered to be useful.

The preparation method for a reactive resin, as illustrated here using the example of a pMDI-based urethane methacrylate, typically occurs as follows:

1. Production of Backbone Resin/Reactive Resin Master Batch

Polymeric methane diphenyl diisocyanate (pMDI) and hydroxypropyl methacrylate (HPMA) are reacted in the presence of a catalyst and an inhibitor (which serves to stabilize the backbone resin formed by the polymerization, often called a stabilizer or process stabilizer).

This produces the backbone resin.

The reaction mixture obtained after completion of the reaction is referred to as a reactive resin master batch. This is not further processed, i.e. the backbone resin is not isolated.

2. Production of Reactive Resin

After completion of the reaction to the backbone resin, an accelerator-inhibitor system, that is, a combination of one or more additional inhibitors, such as TEMPOL, and one or more accelerators, for example di-iso-propanol-p-toluidine and catechol, as well as one or more reactive diluents are added to the reactive resin master-batch.

Thereby the reactive resin is obtained.

The accelerator-inhibitor system serves to set the reactivity of the reactive resin, i.e. to set the time by which the reactive resin is not fully cured after addition of an initiator and, therefore, by which time a dowel mass mixed with the reactive resin remains processable after mixing with the initiator.

The inhibitor in the accelerator-inhibitor system may be the same as the inhibitor in the production of the backbone resin, if it is also capable of setting the reactivity, or another inhibitor, if it does not have both functions. TEMPOL for example may be used for setting the reactivity as a stabilizer and as an inhibitor.

Within the meaning of the invention:

"backbone resin" means a typically solid or high-viscosity radically polymerizable resin which cures by polymerization (e.g. after addition of an initiator in the presence of an accelerator);

"reactive resin master batch" means the reaction product of the reaction for producing the backbone resin, i.e. a mixture of backbone resin, stabilizer and other constituents of the reaction mixture;

"reactive resin" means a mixture of a reactive resin master batch, one accelerator and one inhibitor (also referred to as an accelerator-inhibitor system), one reactive diluent and optionally further additives; the reactive resin is typically liquid or viscous and can be further processed to form a reactive resin component; the reactive resin is also referred to herein as a "resin mixture";

"inhibitor" means a substance which suppresses unwanted radical polymerization during the synthesis or storage of a resin or a resin-containing composition (these substances are also referred to in the art as "stabilizers") or which delays the radical polymerization of a resin after addition of a initiator, usually in conjunction with an accelerator (these substances are also referred to in the art as "inhibitors"—the meaning of each term is apparent from the context);

"initiator" means a substance which (usually in combination with an accelerator) forms reaction-initiating radicals;

"accelerator" means a reagent which reacts with the initiator so that larger quantities of free radicals are produced by the initiator even at low temperatures, or which catalyzes the decomposition reaction of the initiator;

"co-accelerator" means a reagent which intervenes in the acceleration reaction either catalytically or stoichiometrically, for example, to rebuild the accelerator, moderate radical production per unit time, further lower the acceleration temperature, or effect a combination of these or other effects;

"reactive diluents" means liquid or low-viscosity monomers and backbone resins which dilute other backbone resins or the reactive resin master batch and thereby impart the viscosity necessary for application thereof, which contain functional groups capable of reacting with the backbone resin, and which for the most part become a constituent of the cured composition (e.g. of the mortar) in the polymerization (curing); reactive diluents are also referred to as co-polymerizable monomers;

"gel time," $t_{m,25} \rightarrow 35°$ C., means the time (t) of the curing phase of a reactive resin as defined herein or a reactive resin component as defined herein in which the temperature is increased from a starting temperature of 25° C. at a gel time measurement to 35° C.; a method for determining the gel time is described in the examples;

"gel time drift" (for a certain selected period of time, for example, 30 or 60 days) means the phenomenon in which the observed gel time deviates from the gel time at the time of reference, when the cure occurs at a time other than the reference standard time of cure (e.g., 18 to 24 hours after the reactive resin master-batch or the reactive resin were prepared);

"resin reactivity" $t_{r,25} \rightarrow 80°$ C., (also referred to herein as "reactivity period") means the time (t) until a temperature of 80° C. is reached on the reactivity curve at a reactivity measurement having a starting temperature ($t_r$) of 25° C. of a resin, of a reactive resin or of a reactive resin component; a method for determining the resin reactivity is described in the examples;

"reactivity drift" (for a certain selected period of time, for example, 30 or 60 days) means the phenomenon that when the cure is at a time other than the reference standard time of cure (e.g., 18 to 24 hours after the reactive resin master-batch or the reactive resin were prepared), the observed resin reactivity deviates from the resin reactivity at the time of reference;

"completion of the reaction" or "Reaction End" or "Reaction Completion" means the time at which a reaction was completely executed; this is recognizable in the case of a chemical reaction, such as, for example, the reaction for producing the backbone resin, as a rule because the exothermicity related to the reaction has ended;

reactive resin component means a liquid or viscous mixture of reactive resin and fillers and optionally further components, e.g. additives; typically, the reactive resin component is one of the two components of a two-component reactive resin system for chemical fastening;

"hardener component" means a composition containing an initiator for the polymerization of a backbone resin; the hardener component may be solid or liquid and may contain, in addition to the initiator, a solvent and fillers and/or additives; typically the hardener component, in addition to the reactive resin component, is the other of the two components of a two-component reactive resin chemical fastening system;

"two-component system" or "two-component reactive resin system" a reactive resin system comprising two separately stored components, a reactive resin component (A) and a hardener component (B), so that a curing of the backbone resin contained in the reactive resin component takes place after the mixing of the two components;

"multi-component system" or "multi-component reactive resin system" a reactive resin system comprising a plurality of separately stored components, including a reactive resin component (A) and a hardener component (B), so that curing of the backbone resin contained in the reactive resin component takes place after the mixing of all components;

"(meth)acrylic . . . / . . . (meth)acrylic . . . " means both the "methacrylic . . . / . . . methacrylic" and the "acrylic . . . / . . . acrylic . . . " compounds; "methacrylic . . . / . . . methacrylic" compounds are preferred in the present invention;

"a," "an," "any," as the indefinite article preceding a class of chemical compounds, e.g. preceding the word "urethane methacrylate," means that one or more compounds included under this class of chemical compounds, e.g. various urethane methacrylates, may be intended. In a preferred embodiment, this article means only a single compound;

"at least one" means numerically "one or more." In a preferred embodiment, the term means numerically "one";

"contain", "comprise", and "include" mean that further constituents may be present in addition to those mentioned. These terms are intended to be inclusive and therefore encompass "consist of." "Consist of" is intended to be exclusive and means that no further constituents may be present. In a preferred embodiment, the terms "contain," "comprise" and "include" mean the term "consist of";

"approximately" or "about" or "approx." before a numerical value means a range of ±5% of this value, preferably ±2% of this value, more preferably ±1% of this value, particularly preferably ±0% of this value (i.e. exactly this value);

a range limited by numbers, e.g. "from 100° C. to 120° C.," means that the two extreme values and any value within this range are disclosed individually.

All standards cited in this text (e.g. DIN standards) were used in the version that was current on the filing date of this application.

A first subject of the invention is a method for the preparation of a reactive resin. A second object of the invention is the reactive resin resulting from this method. A third object is a reactive resin component (A) containing a reactive resin resulting from this method. A fourth object is a method for producing such a reactive resin component (A). A fifth object is a reactive resin system comprising a reactive resin component (A) of the invention and a hardener component (B) containing an initiator (such as a peroxide) for curing the backbone resin contained in the reactive resin. The components (A) and (B) are packaged spatially separated from each other until use of the reactive resin system, so that a reaction takes place only when the two components are brought into contact with each other.

The method according to the invention for producing a reactive resin comprises the following steps:
 (a) preparing at least one backbone resin which is a urethane(meth)acrylate resin from at least one isocyanate which is pMDI and at least one hydroxy-functionalized (meth)acrylate over a period t1 at a temperature T1; immediately following completion of the reaction to the backbone resin, then
 (b) stirring the reactive resin master-batch resulting from step (a) containing the backbone resin for a period t2 at a temperature T2;
 (c) after completion of the t2 period, adding at least one inhibitor, wherein the at least one inhibitor is a piperidinyl-N-oxyl or a tetrahydropyrrole N-oxyl or a mixture thereof, and wherein the addition of the at least one inhibitor is either (i) immediately after completion of the period t2 at the temperature T2 or (ii) after cooling the mixture resulting from step (b) to a temperature T3 after expiration of a period t3 starting from the end of the period t2; and
 (d) adding at least one accelerator and optionally at least one reactive diluent before, simultaneously with, or after the addition of the inhibitor to obtain the reactive resin.

The preparation of the backbone resin is carried out by methods known in the art, for example by reacting the required starting compounds with at least one catalyst, optionally at least one method stabilizer and optionally at least one solvent or at least one reactive diluent. Typically, all manufacturing steps are carried out while stirring, but other types of mixing are also conceivable. The other components for the preparation of the reactive resin are added to the reaction mixture (i.e. the reactive resin master-batch) only after completion of the reaction for the preparation of the backbone resin. Alternatively, individual components of the reactive resin, in particular thermally stable and non-reactive components, of the reaction mixture for the preparation of the backbone resin can be added to the backbone resin even before the beginning of the reaction. However, the addition of these other components is preferred after completion of the reaction to the backbone resin.

The method according to the invention is firstly characterized by the time in which the at least one inhibitor, i.e. the piperidinyl-N-oxyl or tetrahydropyrrole-N-oxyl or a mixture thereof, is added to the mixture in step (c). The addition takes place after the expiration of the period t2. This period, during which the reaction mixture is kept at the temperature T2, is characteristic of the invention, because during this period it is presumed that impurities which could lead to the degradation of the inhibitor added according to the invention in step (c) are destroyed. After expiration of t2, it is also possible to wait for the time period t3 before the inhibitor is added. This allows a flexible handling of the method according to the invention and the temperature at which the inhibitor is added.

Second, the method according to the invention is characterized by the temperature T2, which is maintained over the period t2. After completion of the reaction in step (a) having the backbone resin as product, the resulting reactive resin master-batch is further stirred for a period t2. The temperature T2 maintained thereby is either constant (in one embodiment it is the same temperature as the reaction temperature T1), or it varies over the period t2. Thus, in a preferred embodiment, for example, T2 may be 100° C. or higher, in particular from 100° C. to 120° C., over a period of at least 2 h. In a preferred embodiment, T2 is about the same temperature as T1 or lower than T1. More preferably, T2 is about T1 or at most 30% lower than T1 (based on the ° C. specification, i.e., for example, at most 22.5° C. lower than T1, when T1 is 75° C.). In another preferred embodiment, T2 is from about 60° C. to about 140° C., more preferably from about 75° C. to about 130° C., even more preferably from about 80° C. to about 125° C., even more preferably from about 85° C. to about 120° C., and more preferably from about 90° C. to about 120° C. Most preferably, T2 is from about 100° C. to about 120° C. In a particularly preferred embodiment, T2 is from 105° C. to 110° C. or a value within this range.

T2 can change over the period t2. When T2 changes, it can be done in steps or continuously. In a preferred embodiment, T2 is initially held constant at one stage (e.g., temperature T1) and then changed, typically lowered.

The period t2 is from about 0.5 hours to about 24 hours, preferably from about 0.75 hours to about 8 hours, more preferably from about 1 hour to about 4 hours, even more preferably from about 1.5 hours to about 3 hours, more preferably from about 2 hours to about 2.5 hours. In a preferred embodiment, t2 is not shorter than about 1.5 hours, more preferably not shorter than about 2 hours. This will ensure that T2 is maintained long enough to break down the contaminant destroying the inhibitor.

As a rule of thumb, the higher the T2, the shorter the period t2. Based on this rule of thumb, a suitable ratio of T2 to t2 can be determined in each case by the person skilled in the art. The product of t2 multiplied by T2, expressed in h times ° C. (h° C.), is advantageously from 75 (e.g. 100 times 0.75) to 480 (e.g. 80 times 6), more preferably 105 (e.g. 105 times 1) h° C. to 360 (e.g. 100 times 3.6) h° C., more preferably from 200 (e.g. 100 times 2) to 300 (e.g. 100 times 3), and most preferably from 210 (e.g. 105 times 2) h° C. to 280 (e.g. 120 times 2.5) h° C. It is most preferably from 240 (e.g. 120 times 2) to 280. If the temperature changes during the course of t2, the mean temperature over the period t2 is used as T2.

This temperature over the period t2 achieves the object of the present invention to reduce or prevent degradation of the at least one piperidinyl-N-oxyl-type and/or tetrahydropyrrole-N-oxyl-type inhibitor added in step (c). A possible explanation for this, without binding the invention to this theory, is that impurities, in particular acid chlorides, which are still present in the reaction mixture directly after the reaction to the backbone resin, can lead to the degradation of the inhibitor. These impurities are destroyed by the action of the temperature T2 during the period t2. If the inhibitor, for example TEMPOL, is added afterward, it will degrade to a lesser extent than would be the case if added immediately after completion of the reaction to the backbone resin. The delayed addition thus protects the inhibitor from degradation. Use of other or additional inhibitors or stabilizers for the inhibitor (to inhibit its degradation) is thus either (advantageously) completely unnecessary, or a smaller amount of these other inhibitors is needed. This increases the efficiency of the method.

The result is a reactive resin which is stable in storage and can be used directly in all fields of application for reactive resins, in particular in reactive resin components of two- or multi-component mortars.

The temperature T3, to which the mixture is brought after expiration of t2, is either equal to T2 or lower than T2. Preferably, T3 is from about 20° C. to about 90° C., more preferably from about 22° C. to about 75° C., even more preferably from about 25° C. to about 60° C., and even more preferably from about 25° C. to about 40° C. Most preferably, T3 is from about 25° C. to about 30° C. In a typical embodiment, T3 is from about 25° C. to about 30° C. and all ingredients except for the inhibitor are added to the mixture during period t3, typically at the beginning of period t3. Since at this time the temperature is still T2 or the cooling to T3 has just begun, this time of addition accelerates the mixing of the components. In contrast, in cases where the inhibitor, which is a piperidinyl-N-oxyl or a tetrahydropyrrole-N-oxyl or a mixture thereof, is added only after the lapse of t3, the maximum interval to the reaction end of the reaction to the backbone resin is maintained. This can further reduce the degradation of the inhibitor. If T3 is lower than T2, this also has a positive effect on the degradation of the inhibitor.

The time period t3 is from about 0.5 h to about 24 h, preferably from about 0.75 h to about 8 h, more preferably from about 1 h to about 4 h, even more preferably from about 1.5 h to about 3 h, more preferably from about 2 hours to about 2.5 hours. Basically, the length of t3 is not as crucial for the invention as the length of t2. However, the shorter t3 is, the more efficient the method becomes.

A reactive resin of the invention is a reactive resin prepared by the method of the present invention for producing a reactive resin. It contains at least one backbone resin, at least one reactive diluent, at least one accelerator, and at least one inhibitor which is a piperidinyl-N-oxyl or a tetrahydropyrrole-N-oxyl or a mixture thereof. Since the backbone resin is used for the production of the reactive resin typically without isolation after its production, the other constituents contained in the reactive resin master-batch in addition to the backbone resin are also usually present in the reactive resin.

A reactive resin component (A) according to the invention contains, in addition to the reactive resin of the invention, one or more fillers. These fillers are typically inorganic.

The inhibitor, which is added in the method according to the invention for the preparation of the reactive resin after completion of the reaction to the backbone resin and after the elapse of the period t2 and optionally t3, is a piperdinyl-N-oxyl or a tetrahydropyrrole-N-oxyl or a mixture thereof. The inhibitor is a stable nitroxyl radical. Such stable nitroxyl radicals of the piperidinyl-N-oxyl or tetrahydropyrrole-N-oxyl type are described in DE 199 56 509 A1 and DE 195 31 649 A1, the contents of which are hereby included in the application.

Preferred stable nitroxyl radicals are selected from the group consisting of 1-oxyl-2,2,6,6-tetramethylpiperidine, 1-oxyl-2,2,6,6-tetramethylpiperidin-4-ol (also referred to as TEMPOL), 1-oxyl-2,2,6,6-tetramethylpiperidin-4-one (also referred to as TEMPON), 1-oxyl-2,2,6,6-tetramethyl-4-carboxyl-piperidine (also referred to as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL) and mixtures of two or more of these compounds, 1-oxyl-2,2,6,6-tetramethylpiperidin-4-ol (TEMPOL) being particularly preferred. The TEMPOL is preferably the TEMPOL used in the examples.

The inhibitor is added in conventional amounts known in the art, preferably in an amount of approximately 0.0005 to approximately 2 wt. % (based on the reactive resin, which is ultimately produced therewith), more preferably from about 0.005 to about 2 wt. % (based on the reactive resin), even more preferably from about 0.01 to about 1 wt. % (based on the reactive resin), even more preferably from about 0.05 to about 1 wt. % (based on the reactive resin), even more preferably from about 0.1 to about 0.6 wt. % (based on the reactive resin), yet more preferably from approximately 0.2 to approximately 0.4 wt. % (based on the reactive resin). Particularly preferred is an amount of about 0.25 to about 0.35 wt. % (based on the reactive resin), most preferably from about 0.25 to about 0.28 wt. % (based on the reactive resin). In particularly preferred embodiments, it is present in the amounts described in the examples.

The backbone resin prepared in the method according to the invention in step (a) and contained in the reactive resin according to the invention is a branched urethane(meth)acrylate or a mixture of two or more urethane(meth)acrylates, of which at least one is a branched urethane(meth)acrylate. The urethane(meth)acrylate is preferably a branched urethane methacrylate or a mixture of two or more urethane(meth)acrylates of which at least one is a branched urethane methacrylate. The reason is the higher alkali stability of methacrylates compared to acrylates.

The branched urethane(meth)acrylates prepared in the context of the present invention are prepared from at least one isocyanate and at least one (meth)acrylate. The at least one isocyanate is a polymeric methylene diphenyl diisocyanate (pMDI) and the (meth)acrylate is preferably a hydroxy-functionalized (meth)acrylate compound. The pMDI is either used directly or prepolymerized with a diol or polyol. Direct use of pMDI is preferred.

When the pMDI is prepolymerized with a diol or polyol, typically the isocyanate is first mixed with the catalyst and with at least one difunctional or higher functional hydroxy compound and possibly also with a reactive diluent to allow a reaction between the isocyanate and the hydroxy compound and to obtain a prepolymerized pMDI. The prepolymerized pMDI is then subsequently used as the isocyanate in step (a) instead of pMDI.

The urethane(meth)acrylate (backbone resin) is prepared from the at least one isocyanate and the at least one (meth)acrylate by reacting the at least one isocyanate with the at least one (meth)acrylate (a hydroxy-functionalized (meth)acrylate is particularly suitable) in the presence of a catalyst and optionally at least one process stabilizer. The resulting reaction mixture is called a reactive resin master-batch.

Preferably, this reaction for the preparation of the backbone resin is performed at a temperature T1 of from about 60° C. to about 140° C., more preferably at a temperature of about 80° C. to about 130° C., even more preferably at a temperature of about 85° C. to about 120° C. Particularly preferred is a temperature of about 90° C. to about 120° C., most preferably from about 100° C. to 120° C. In a preferred embodiment, the reactive resin master-batch is stirred after completion of the reaction at a temperature T2, which is the reaction temperature T1 or from 0% to about a maximum of 30% lower than T1 (based on the ° C. statement, i.e. at a maximum of 22.5° C. lower than T1, for example, when T1 is 75° C.). The preferred ranges for T2 are already indicated above.

The period t1 is determined by how long the reaction takes for the production of the backbone resin. The completion of the reaction is indicated by the fact that the exothermicity ends. The duration can be influenced by the reaction temperature T1 and by how fast the complete addition of the reactants to each other is completed. To control the reaction, typically the pMDI is added dropwise to the (meth)acrylate.

The hydroxy-functionalized (meth)acrylate is preferably used in such an amount that at least one mole of the hydroxy-functionalized (meth)acrylate is used per mole of isocyanate group. Usually, a slight excess of hydroxy-functionalized (meth)acrylate is used to ensure a complete or almost complete reaction so that only a very small proportion or no free isocyanate group remains after the reaction. This is intended, inter alia, to prevent the still free isocyanate groups from co-polymerizing with the reactive diluent optionally added for the preparation of the reactive resin from the reactive resin master-batch during the curing of the resin.

Alternatively and preferably, the hydroxy-functionalized (meth)acrylate can be used in a significant excess, wherein the compound non-reacting with the isocyanate acts as a reactive diluent for the reaction and for the subsequently produced resin mixture with the urethane(meth)acrylate resin.

If a pre-polymerized pMDI is used, which is prepared by reacting the isocyanate with at least one di- or higher functional hydroxy compound in the presence of the catalyst, the following components are suitable as di- or higher functional hydroxy compounds: dihydric or higher alcohols, e.g. secondary products of ethylene or propylene oxide, such as ethanediol, di- or triethylene glycol, propanediol, dipropylene glycol, other diols, such as 1,4-butanediol, 1,6-hexanediol, neopentyl glycol, diethanolamine, further bisphenol-A or F or their ethoxylation and/or hydrogenation or halogenation products, higher alcohols, such as glycerol, trimethylolpropane, hexanetriol and pentaerythritol, hydroxyl-containing polyether, e.g. oligomers aliphatic or aromatic oxiranes and/or higher cyclic ethers, e.g. ethylene oxide, propylene oxide, styrene oxide and furan, polyethers containing aromatic structural units in the main chain, e.g. those of the bisphenol A or F, hydroxyl-containing polyester based on the above alcohols or polyethers and dicarboxylic acids or their anhydrides, e.g. adipic acid, phthalic acid, tetra or hexahydrophthalic acid, hetic acid, maleic acid, fumaric acid, itaconic acid, sebacic acid and the like. Particular preference is given to hydroxy compounds having aromatic structural units for chain stiffening or increasing the heat resistance (WFB) of the resin, hydroxy compounds which contain unsaturated structural units, such as fumaric acid, for increasing the crosslinking density, branched or star-shaped hydroxy compounds, in particular trihydric or higher alcohols and/or polyethers or polyesters containing their structural units, branched or star-shaped urethane(meth)acrylates to achieve lower viscosity of the resins or their solutions in reactive diluents and higher reactivity and crosslinking density.

The amount of optional difunctional or higher functional hydroxy compounds may vary widely as long as excess isocyanate groups remain in the prepolymerized pMDI. The molar ratio between the hydroxyl groups of the further difunctional or higher functional hydroxy compound and the isocyanate groups is generally greater than about 0.01, more preferably greater than about 0.05, and even more preferably greater than about 0.1. The molar ratio between the hydroxyl groups of the further difunctional or higher functional hydroxy compound and the isocyanate groups is preferably less than about 0.95, more preferably less than about 0.9, and even more preferably less than about 0.7.

Suitable hydroxy-functionalized (meth)acrylates are acrylic acids and acrylic esters substituted with one or more hydroxyl groups on the hydrocarbon radical. These are preferably selected from the group consisting of hydroxymethacrylic acid, hydroxyl-containing esters of (meth) acrylic acid with dihydric or polyhydric alcohols, pentaerythritol tri(meth)acrylate, glycerol di(meth)acrylates such as trimethylolpropane di(meth)acrylate, and neopentyl glycol mono(meth)acrylate. Preferred are (meth)acrylic acid hydroxyalkyl esters such as hydroxyethyl(meth)acrylate (HEMA), 2-hydroxypropyl(meth)acrylate, 3-hydroxypropyl (meth)acrylate, 2-hydroxybutyl(meth)acrylate, 3-hydroxybutyl(meth)acrylate, 2-hydroxycyclohexyl(meth)acrylate, glycerol-1,3-di(meth)acrylate (GDMA), glycerol-1,3-diacrylate (GDA), glycerol methacrylate (GMA), glycerol acrylate (GA), polyoxyethylene(meth)acrylate and polyoxypropylene(meth)acrylate, mixtures of their isomers, as well as mixtures of two or more of these compounds, since such compounds serve to sterically hinder the saponification reaction. More preferred are methacrylic acid hydroxyalkyl esters such as hydroxyethyl methacrylate, 2-hydroxypropyl methacrylate, 3-hydroxypropyl methacrylate, 2-hydroxybutyl methacrylate, 3-hydroxybutyl methacrylate, 2-hydroxycyclohexyl methacrylate, glycerol 1,3-dimethacrylate, glycerol methacrylate, and mixtures of two or more of these compounds. Particularly preferred is 2-hydroxypropyl methacrylate or 3-hydroxypropyl methacrylate or a mixture of 2- and 3-hydroxypropyl methacrylate (HPMA). Very particular preference is given to a mixture of 2- and 3-hydroxypropyl methacrylate (HPMA) in which the 2-hydroxypropyl methacrylate is the main component (the abbreviation HPMA is usually used for mixtures of this kind; for example, Visiomer HPMA 98 contains 98% of 2-hydroxypropyl methacrylate according to the manufacturer). Such mixtures are offered as commercial HPMA. Especially preferred are the hydroxy-functionalized (meth)acrylates used in the examples.

In addition to the pMDI or the prepolymerized pMDI, it is also possible to use one or more further isocyanates or isocyanate prepolymers for the preparation of the backbone resin.

According to the invention, the catalysts customarily used for the preparation of urethane(meth)acrylate resins can be used for the reaction of the pMDI or the prepolymerized pMDI with the hydroxy-functionalized (meth)acrylate.

The publication "Catalysis of the Isocyanate-Hydroxyl Reaction with Non-Tin Catalysts" by W. J. Blank. Z. A. He and E. T. Hessell, 24th International Conference in Organic Coatings, Athens, Greece, describes organic metal salts and chelates which are suitable for the production of urethane compounds, explicitly mentioning the following compounds: Chromium(III)dionate, chromium(III)octoate, titanium tetrabutoxide, calcium octoate, bismuth carboxylate, zirconium acetoacetate, zirconium tetradionate complex, and zirconium tetrakis(2,4-pentanedionato) complex. WO 2012/076686 A1 mentions other similar compounds which are also suitable for the preparation of urethane resins, zirconium alkoxides, such as zirconium tetrabutoxide, and zirconium carboxylates, such as zirconium tetraacetylacetonate, being described as being particularly effective.

Organotin compounds are frequently used catalysts, in particular dibutyltin dilaurate or dioctyttin dilaurate. Dibutytin dilaurate is particularly preferred in terms of its reactivity and selectivity.

Alternatively, the catalyst may be selected from the groups of compounds such as zinc alkoxides such as zinc neodecanoate and zinc octoate, zinc carboxylates such as zinc acetylacetonate, zinc oxalate and zinc acetate, zirconium octoate and iron acetylacetonate. These have the advantage over the compounds already mentioned of having only a reduced or no toxicity and thereby ensuring a selective and rapid reaction of the isocyanate compounds used with both primary and secondary hydroxy compounds, without negatively affecting the curing of the resin compositions prepared therewith. Zinc catalysts, however, can catalyze an allophanatization; therefore tin catalysts are preferred.

The resulting urethane(meth)acrylate preferably has a molecular weight $M_n$ in the range of about 500 to about 2500 daltons, more preferably from about 500 to about 1500 daltons (according to ISO 13885-1).

The urethane(meth)acrylate prepared by the method of the present invention may contain other reactive groups which may be polymerized with a free radical initiator such as peroxides, for example, reactive groups derived from itaconic acid, citraconic acid or allylic or vinylic groups and such as styrene derivatives, crotonic acid derivatives, allyl alcohol, ethylene glycol vinyl ether, allyloxyethanol, diethylene glycol monoallyl ether, di(ethylene glycol)vinyl ethers and vinylcyclopropane derivatives. These other reactive groups may be introduced with appropriate reactants into the urethane(meth)acrylate by reaction of free hydroxyl groups in the urethane(meth)acrylate (e.g., free hydroxyl groups of prepolymerized pMDI remaining in the reaction product after reaction with HPMA). Such reactions are known to the person skilled in the art.

The percentage (in wt. % of the reactive resin) of urethane (meth)acrylate in the reactive resin produced by the method of the invention is advantageously greater than about 5%, preferably greater than about 15%, and most preferably greater than about 20%. The percentage (in wt. % of the reactive resin) of urethane(meth)acrylate in the reactive resin is advantageously from about 5% to about 90%, preferably from about 8% to about 80%, more preferably from about 10% to about 60%, more preferably from about 20% to about 55%, even more preferably from about 25% to about 55%, more preferably from about 25% to about 50%, and most preferably from about 28% to about 45%.

In addition to the nitroxyl radical of the piperidinyl-N-oxyl or tetrahydropyrrole-N-oxyl type, one or more further inhibitors may be present both to further stabilize the reactive resin or the reactive resin component (A) containing the reactive resin or other compositions containing the reactive resin and to adjust the resin reactivity.

For this purpose, the inhibitors which are conventionally used for radically polymerizable compounds are suitable, as are known to a person skilled in the art. These further inhibitors are preferably selected from phenolic compounds and non-phenolic compounds and/or phenothiazines.

Phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'-methylene-di-p-cresol, catechols such as pyrocatechol, and catechol derivatives such as butyl catechols such as 4-tert-butylpyrocatechol and 4,6-di-tert-butylpyrocatechol, hydroquinones such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, or mixtures of two or more thereof, are suitable as phenolic inhibitors. These inhibitors are often a constituent of commercial radically curing reactive resin components.

Phenothiazines such as phenothiazine and/or derivatives or combinations thereof, or stable organic radicals such as galvinoxyl and N-oxyl radicals, but not of the piperidinyl-N-oxyl or tetrahydropyrrole-N-oxyl type, are preferably considered as non-phenolic inhibitors, such as aluminum-N-nitrosophenylhydroxylamine, diethylhydroxylamine, oximes such as acetaldoxime, acetone oxime, methyl ethyl ketoxime, salicyloxime, benzoxime, glyoximes, dimethylglyoxime, acetone-O-(benzyloxycarbonyl)oxime, and the like.

Furthermore, pyrimidinol or pyridinol compounds substituted in para-position to the hydroxyl group, as described in the patent DE 10 2011 077 248 B1, can be used as inhibitors.

Preferably, the other inhibitors are selected from the group of catechols, catechol derivatives and phenothiazines. Particularly preferably, the other inhibitors are selected from the group of catechols and phenothiazines. The further inhibitors used in the examples are very particularly preferred, preferably approximately in the amounts indicated in the examples.

The other inhibitors may be used either alone or as a combination of two or more thereof, depending on the desired properties of the reactive resin. The combination of phenolic and non-phenolic inhibitors allows a synergistic effect, as well as the setting of a substantially drift-free adjustment of the resin reactivity of the reactive resin shows.

The further inhibitors are present in an amount of from about 0.005 to about 3 wt. %, preferably from about 0.01 to about 1 wt. %, more preferably from about 0.02 to about 0.4 wt. %, more preferably from about 0.05 to about 0.2 wt. %, based on the resin mixture.

In step (c), in addition to the at least one inhibitor of the piperidinylN-oxyl or tetrahydropyrroleN-oxyl type and the optional further inhibitor, at least one accelerator is also typically added. As a result, fast-curing reactive resins and reactive resin components are obtained, which cure at room temperature (cold-curing). Suitable accelerators are known to the person skilled in the art. These are useful amines, preferably toluidines, and/or metal salts.

Amines suitable as accelerators are selected from the following compounds, which are described, for example, in the application US 2011071234 A1: Dimethylamine, triethylamine, ethylamine, diethylamine, triethylamine, n-propylamine, di-n-propylamine, tri-n-propylamine, iso-propylamine, di-iso-propylamine, tri-iso-propylamine, n-butylamine, iso-butylamine, tert-butylamine, di-n-butylamine, di-iso-butylamine, tri-iso-butylamine, n-pentylamine, iso-pentylamine, di-iso-pentylamine, hexylamine, octylamine, dodecylamine, laurylamine, stearylamine, aminoethanol, diethanolamine, triethanolamine, aminohexanol, ethoxyaminoethane, dimethyl(2-chloroethyl)amine, 2-ethylhexylamine, bis(2-chloroethyl)amine, 2-ethylhexylamine, bis(2-ethylhexyl)amine, N-methylstearylamine, dialkylamines, ethylenediamine, N,N'-dimethylethylenediamine, tetramethylethylenediamine, diethylenetriamine, permethyldiethylenetriamine, triethylenetetramine, tetraethylenepentamine, 1,2-diaminopropane, di-propylenetriamine, tripropylenetetramine, 1,4-diaminobutane, 1,6-diaminohexane, 4-amino-1-diethylaminopentane, 2,5-diamino-2,5-dimethylhexane, trimethylhexamethylenediamine, N,N-dimethylaminoethanol, 2-(2-diethylaminoethoxy)ethanol, bis(2-hydroxyethyl)oleylamine, tris[2(2-hydroxyethoxy)ethyl]amine, 3-amino-1-propanol, methyl(3-aminopropyl)ether, ethyl-(3-aminopropyl)ether, 1,4-butanediol-bis(3-aminopropyl ether), 3-dimethylamino-1-propanol, 1-amino-2-propanol, 1-diethylamino-2-propanol, di-iso-propanolamine, methyl-bis(2-hydroxypropyl)amine, tris(2-hydroxypropyl)amine, 4-amino-2-butanol, 2-amino-2-methylpropanol, 2-amino-2-methylpropanediol, 2-amino-2-hydroxymethylpropanediol, 5-diethylamino-2-pentanone, 3-methylaminopropionitrile, 6-aminohexanoic acid, 11-aminoundecanoic acid, 6-aminohexanoic acid ethyl ester, 11-aminohexanoate-isopropyl ester, cyclohexylamine, N-methylcyclohexylamine, N,N-dimethylcyclohexylamine, dicyclohexylamine, N-ethylcyclohexylamine, N-(2-hydroxyethyl)cyclohexylamine, N,N-bis(2-hydroxyethyl)cyclohexylamine, N-(3-aminopropyl)cyclohexylamine, aminomethylcyclohexane, hexahydrotoluidine, hexahydrobenzylamine, aniline, N-methylaniline. N,N-dimethylaniline, N,N-diethylaniline, N,N-di-propylaniline, iso-butylaniline, toluidine, diphenylamine, hydroxyethylaniline, bis(hydroxyethyl)aniline, chloroaniline, aminophenols, aminobenzoic acids and esters thereof, benzylamine, dibenzylamine, tribenzylamine, methyldibenzylamine, f-phenylethylamine, xylidine, di-iso-propylaniline, dodecylaniline, aminonaphthalin, N-methylaminonaphthalin, N,N-dimethylaminonaphthalin. N,N-dibenzylnaphthalin, diaminocyclohexane, 4,4'-diaminodicyclohexylmethane, diamino-dimethyl-dicyclohexylmethane, phenylenediamine, xylylenediamine, diaminobiphenyl, naphthalenediamines, toluidines, benzidines, 2,2-bis(aminophenyl)propane, aminoanisoles, aminothiophenols, aminodiphenyl ethers, aminocresols, morpholine, N-methylmorpholine, N-phenylmorpholine, hydroxyethylmorpholine, N-methylpyrrolidine, pyrrolidine, piperidine, hydroxyethylpiperidine, pyrroles, pyridines, quinolines, indoles, indolenines, carbazoles, pyrazoles, imidazoles, thiazoles, pyrimidines, quinoxalines, aminomorpholine, dimorpholineethane, [2,2,2]-diazabicyclooctane and N,N-dimethyl-p-toluidine.

Polymeric amines, such as those obtained by polycondensation of N,N-bis(hydroxyalkyl)aniline with dicarboxylic acids or by polyaddition of ethylene oxide or other epoxides and these amines, are also suitable as accelerators.

Metal salts suitable as accelerators are, for example, cobalt octoate or cobalt naphthenoate as well as vanadium, potassium, calcium, copper, iron, manganese or zirconium carboxylates. Other suitable metal salts are the tin catalysts described above.

Aniline and toluidine derivatives and N,N-bisalkylarylamines are preferred as accelerators, such as N,N-dimethylaniline, N,N-diethylaniline, N,N-dimethyl-p-toluidine, N,N-bis(hydroxyalkyl)arylamine, N,N-bis(2-hydroxyethyl)aniline, N,N-bis(2-hydroxyethyl)toluidine, N,N-bis(2-hydroxypropyl)aniline, N,N-bis(2-hydroxypropyl)toluidine, N,N-Bis(3-methacryloyl-2-hydroxypropyl)-p-toluidine, N,N-diputoxyhydroxypropyl-p-toluidine and 4,4'-bis(dimethylamino)diphenylmethane. Di-iso-propanol-p-toluidine is particularly preferred.

The accelerator is used in an amount of about 0.01 to about 10 wt. %, preferably about 0.2 to about 5 wt. %, more preferably about 0.5 to about 3 wt. %, even more preferably about 1 to about 2.5 wt. %, even more preferably from about 1.4 to about 2.2 wt. %, based on the reactive resin used.

Preferred accelerators are the accelerators used in the examples, preferably approximately in the amounts indicated in the examples.

A co-accelerator may also be added to the reactive resin master-batch, particularly when a transition metal compound is used as the accelerator. Depending on the transition metal compound chosen, the person skilled in the art will be able to select a suitable co-accelerator to achieve the desired cure properties. When a cobalt compound is used as the accelerator, the co-accelerator is preferably an amine and/or a 1,3-dioxo compound. When a copper compound is used as an accelerator, the co-accelerator is preferably an amine, an acetoacetamide, a potassium salt, an imidazole and/or a gallate or mixtures thereof. When a manganese compound is used as the accelerator, the co-accelerator is preferably a 1,3-dioxo compound, a thiol and/or a potassium or lithium salt or mixtures thereof. When an iron compound is used as the accelerator, the co-accelerator is preferably a 1,3-dioxo compound and/or a thiol, preferably in combination with an alkali metal salt. Suitable 1,3-dioxo compounds are acetylacetone, acetoacetates and acetoacetamides.

The amount of optional co-accelerator in the reactive resin can vary widely and is preferably in the range of about 0.01% to about 10 wt. %, preferably about 0.1 to about 5 wt. %, based on the total weight of the reactive resin.

The accelerator and, if appropriate, the co-accelerator may be added to the reactive resin master-batch, either individually or as a mixture, together with the optional further reactive diluent. Alternatively, if appropriate, the accelerator may be added together with the co-accelerator to the reactive resin master-batch already treated with reactive diluent.

The reactive resin master-batch may optionally already contain at least one reactive diluent.

In this case, as already mentioned, the excess of hydroxy-functionalized (meth)acrylate can act as a reactive diluent. In addition, if the hydroxy-functionalized (meth)acrylate is used in approximately equimolar amounts with the isocyanate group, or in addition if an excess of hydroxy-functionalized (meth)acrylate is used, further reactive diluents may be added to the reaction mixture which are structurally different from the hydroxy-functionalized (meth)acrylate.

Suitable reactive diluents are low-viscosity, radically copolymerizable compounds, preferably labeling-free compounds, which are added in order to, inter alia, adjust the viscosity of the urethane(meth)acrylate or precursors during its preparation, if required.

Suitable reactive diluents are described in the applications EP 1 935 860 A1 and DE 195 31 649 A1. Preferably, the resin mixture contains, as the reactive diluent, a (meth)acrylic acid ester, particularly preferably aliphatic or aromatic $C_5$-$C_{15}$-(meth)acrylates being selected. Suitable examples include: 3-hydroxypropyl(meth)acrylate, 1,2-ethanediol di(meth)acrylate, 1,3-propanedioldi(meth)acrylate, 1,3-butanediol di(meth)acrylate, 1,4-butanediol di(meth)acrylate, trimethylolpropane tri(meth)acrylate, phenethyl (meth)acrylate, tetrahydrofurfuryl (meth)acrylate, ethyltriglycol (meth)acrylate, N,N-dimethylaminoethyl (meth)acrylate, N,N-dimethylaminomethyl (meth)acrylate, acetoacetoxyethyl (meth)acrylate, isobornyl (meth)acrylate, 2-ethylhexyl (meth)acrylate, diethylene glycol di(meth)acrylate, methoxypolyethylene glycol mono(meth)acrylate, trimethylcyclohexyl (meth)acrylate, 2-hydroxyethyl (meth)acrylate, dicyclopentenyloxyethyl (meth)acrylate and/or tricyclopentadienyl di(meth)acrylate, bisphenol-A-(meth)acrylate, novolac epoxy di(meth)acrylate, di-[(meth)acryloyl-maleoyl]-tricyclo-5.2.1.0.$^{2.6}$-decane, dicyclopentenyloxyethylcrotonat, 3-(meth)acryloyl-oxymethyl-tricylo-5.2.1.0.$^{2.6}$-decane, 3-(meth)cyclopentadienyl (meth)acrylate, and decalyl-2-(meth)acrylate; PEG-di(meth)acrylate such as PEG200 di(meth)acrylate, tetraethylene glycol di(meth)acrylate, solketal (meth)acrylate, cyclohexyl (meth)acrylate, phenoxyethyl di(meth)acrylate, methoxyethyl (meth)acrylate, tert-butyl (meth)acrylate and norbornyl (meth)acrylate. Methacrylates are preferred over acrylates. Particularly preferred are 2- and 3-hydroxypropyl methacrylate, 1,2-ethanediol dimethacrylate, 1,4-butanediol dimethacrylate (BDDMA), 1,3-butanediol dimethacrylate, trimethylolpropane trimethacrylate, acetoacetoxyethyl methacrylate, isobornyl methacrylate, bisphenol A methacrylate, trimethylcyclohexyl methacrylate, 2-hydroxyethyl methacrylate, PEG200 dimethacrylate and norbornyl methacrylate. Very particular preference is given to 1,4-butanediol dimethacrylate and a mixture of 2- and 3-hydroxypropyl methacrylate, or a mixture of these three methacrylates. A mixture of 2- and 3-hydroxypropyl methacrylate is most preferred. In principle, other conventional radically polymerizable compounds, alone or in a mixture with the (meth)acrylic acid esters, can also be used as reactive diluents, e.g. styrene, α-methylstyrene, alkylated styrenes, such as tert-butylstyrene, divinylbenzene and vinyl and allyl compounds, of which the representatives that are not subject to labelling are preferred. Examples of such vinyl or allyl compounds are hydroxybutyl vinyl ether, ethylene glycol divinyl ether, 1,4-butanediol divinyl ether, trimethylolpropane divinyl ether, trimethylolpropane trivinyl ether, mono-, di-, tri-, tetra- and polyalkylene glycol vinyl ether, mono-, di-, tri-, tetra- and polyalkylene glycol allyl ether, divinyl adipate, trimethylolpropane diallyl ether and trimethylolpropane triallyl ether.

Preferred reactive diluents are the reactive diluents used in the examples, preferably approximately in the amounts indicated in the examples.

The reactive diluent(s) is/are added preferably in an amount of 0 to about 80 wt. %, more preferably from about 10 to about 60 wt. %, even more preferably from about 20 to about 50 wt. %, based on the reactive resin.

Suitably, the curing of the reactive resin is initiated with a peroxide as initiator. Any of the peroxides known to a person skilled in the art that are used to cure urethane(meth)acrylate resins can be used. Such peroxides include organic and inorganic peroxides, either liquid or solid, it also being possible to use hydrogen peroxide. Examples of suitable peroxides are peroxycarbonates (of the formula —OC(O)OO—), peroxyesters (of the formula —C(O)OO—), diacyl peroxides (of the formula —C(O)OOC(O)—), dialkyl peroxides (of the formula —OO—), hydroperoxides (of the formula —OOH), and the like. These may be present as oligomers or polymers. A comprehensive set of examples of suitable peroxides is described, for example, in application US 2002/0091214 A1, paragraph [0018].

Preferably, the peroxides are selected from the group of organic peroxides. Suitable organic peroxides are: tertiary alkyl hydroperoxides such as tert-butyl hydroperoxide and other hydroperoxides such as cumene hydroperoxide, peroxyesters or peracids such as tert-butyl peresters (e.g. tert-butyl peroxybenzoate), benzoyl peroxide, peracetates and perbenzoates, lauroyl peroxide including (di)peroxyesters, perethers such as peroxy diethyl ethers, perketones, such as methyl ethyl ketone peroxides. The organic peroxides used as hardeners are often tertiary peresters or tertiary hydroperoxides, i.e. peroxide compounds having tertiary carbon atoms which are bonded directly to an —O—O-acyl or —OOH-group. However, mixtures of these peroxides with other peroxides can also be used according to the invention. The peroxides may also be mixed peroxides, i.e. peroxides which have two different peroxide-carrying units in one molecule. In a preferred embodiment, benzoyl peroxide (BPO) or tert-butyl peroxybenzoate is used for curing. In a particularly preferred embodiment, one of the peroxides described in the examples is used to cure.

The present invention is the method described herein for the production of a reactive resin. The subject matter is furthermore the reactive resin produced by this method.

The proportion of the reactive resin master-batch according to the invention to the reactive resin according to the invention is preferably selected so that the amount of the urethane(meth)acrylate (i.e. the backbone resin) used according to the invention ranges from about 15 wt. % to about 95 wt. %, preferably from about 20 wt. % to about 60 wt. %, more preferably from about 30 wt. % to about 50 wt. %, based on the reactive resin.

The present invention also provides a reactive resin system consisting of a reactive resin component (A) and a hardener component (B). The reactive resin component (A) alone is also an object of the present invention. Said reactive resin component (A) contains the reactive resin of the invention.

Component (A) may contain fillers and/or additives in addition to the reactive resin of the invention. It should be noted that some substances can be used both as a filler and, optionally, in modified form, as an additive. For example, fumed silica is used preferably as a filler in its polar, non-after-treated form and preferably as an additive in its non-polar, after-treated form. In cases in which exactly the same substance can be used as a filler or additive, its total amount should not exceed the upper limit for fillers that is established herein.

In order to produce a reactive resin component for construction applications, in particular chemical fastening, conventional fillers can be added to the reactive resin according to the invention. These fillers are typically inorganic fillers, as described below for example.

The proportion of the reactive resin in the reactive resin component is preferably from approximately 10 to approximately 70 wt. %, more preferably from approximately 30 to approximately 50 wt. %, based on the reactive resin component. Accordingly, the proportion of the fillers is preferably from approximately 90 to approximately 30 wt. %, more preferably from approximately 70 to approximately 50 wt. %, based on the reactive resin component.

The fillers used are conventional fillers, preferably mineral or mineral-like fillers, such as quartz, glass, sand, quartz sand, quartz powder, porcelain, corundum, ceramics, talc, silicic acid (e.g. fumed silica, in particular polar, non-after-treated fumed silica), silicates, aluminum oxides (e.g. alumina), clay, titanium dioxide, chalk, barite, feldspar, basalt, aluminum hydroxide, granite or sandstone, polymeric fillers such as thermosets, hydraulically curable fillers such as gypsum, quicklime or cement (e.g. aluminate cement (often referred to as alumina cement) or Portland cement), metals such as aluminum, carbon black, further wood, mineral or organic fibers, or the like, or mixtures of two or more thereof. The fillers may be present in any desired forms, for example as powder or flour, or as shaped bodies, for example in cylindrical, annular, spherical, platelet, rod, saddle or crystal form, or else in fibrous form (fibrillar fillers), and the corresponding base particles preferably have a maximum diameter of approximately 10 mm and a minimum diameter of approximately 1 nm. This means that the diameter is approximately 10 mm or any value less than approximately 10 mm, but more than approximately 1 nm. Preferably, the maximum diameter is a diameter of approximately 5 mm in diameter, more preferably approximately 3 mm, even more preferably approximately 0.7 mm. A maximum diameter of approximately 0.5 mm is very particularly preferred. The more preferred minimum diameter is approximately 10 nm, more preferably approximately 50 nm, most preferably approximately 100 nm. Diameter ranges resulting from combination of this maximum diameter and minimum diameter are particularly preferred. However, the globular, inert substances (spherical form) have a preferred and more pronounced reinforcing effect. Core-shell particles, preferably in spherical form, can also be used as fillers.

Preferred fillers are selected from the group consisting of cement, silicic acid, quartz, quartz sand, quartz powder, and mixtures of two or more thereof. For the reactive resin component (A), fillers selected from the group consisting of cement, fumed silica, in particular untreated, polar fumed silica, quartz sand, quartz powder, and mixtures of two or more thereof are particularly preferred. For the reactive resin component (A), a mixture of cement (in particular aluminate cement (often also referred to as alumina cement) or Portland cement), fumed silica and quartz sand is very particularly preferred. For the hardener component (B), fumed silica is preferred as the sole filler or as one of a plurality of fillers; particularly preferably, one or more further fillers are present in addition to the fumed silica.

The additives used are conventional additives, i.e. thixotropic agents, such as optionally organically or inorganically after-treated fumed silica (if not already used as a filler), in particular non-polarly after-treated fumed silica, bentonites, alkyl- and methylcelluloses, castor oil derivatives or the like, plasticizers, such as phthalic or sebacic acid esters, further stabilizers in addition to the stabilizers and inhibitors according to the invention, antistatic agents, thickeners, flexibilizers, rheology aids, wetting agents, coloring additives, such as dyes or in particular pigments, for example for different staining of the components for improved control of their mixing, or the like, or mixtures of two or more thereof. Non-reactive diluents (solvents) can also be present, preferably in an amount of up to 30 wt. %, based on the total amount of the reactive resin component, such as low-alkyl ketones, for example acetone, di-low-alkyl low-alkanoyl amides, such as dimethylacetamide, low-alkylbenzenes, such as xylenes or toluene, phthalic acid esters or paraffins, water or glycols. Furthermore, metal catchers in the form of surface-modified fumed silicas may be present in the reactive resin component. Preferably, at least one thixotropic agent is present as an additive, particularly preferably an organically or inorganically after-treated fumed silica, very particularly preferably a non-polar, after-treated fumed silica.

In this regard, reference is made to the patent applications WO 02/079341 and WO 02/079293 as well as WO 2011/128061 A1, the contents of which are hereby incorporated in this application.

The proportion of the additives in the reactive resin component may be up to approximately 5 wt. %, based on the reactive resin component.

In one embodiment, the reactive resin component may additionally contain an adhesion promoter. By using an adhesion promoter, the cross-linking of the borehole wall with the dowel composition is improved such that the adhesion increases in the cured state. This is important for the use of a two-component dowel mass, for example in drill holes drilled with a diamond drill, and increases the failure composite stress. Suitable adhesion promoters are selected from the group of silanes which are functionalized with further reactive organic groups and can be incorporated into the polymer network. This group includes, for example, 3-(meth)acryloyloxypropyltrimethoxysilane, 3-(meth)acryloyloxypropyitriethoxysilane, 3-(meth)acryloyloxymethyftrimethoxysilane, 3-(meth)acryloyloxymethyltriethoxysilane, vinyltrimethoxysilane, vinyltriethoxysilane, functionalized tetraethoxysilane, functionalized tetramethoxysilane, functionalized tetrapropoxysilane, functionalized ethyl or propyl polysilicate, and mixtures of two or more thereof. In this regard, reference is made to the application DE 10 2009 059210, the content of which is incorporated herein by reference.

The adhesion promoter is expediently contained in amounts of from about 1 to about 10 wt. %, based on the total weight of the reactive resin component, in the reactive resin component (A).

In a particularly preferred embodiment of the reactive resin system according to the invention, the reactive resin system is a two-component system and the reactive resin component (A) also contains, in addition to the backbone resin, a hydraulically setting or polycondensable inorganic compound, in particular cement, and the hardener component (B) also contains, in addition the initiator for the polymerization of the backbone resin, water. Such hybrid mortar systems are described in detail in DE 4231161 A1. In this case, component (A) preferably contains, as a hydraulically setting or polycondensable inorganic compound, cement, for example Portland cement or alumina cement, with transition metal oxide-free or transition metal-low cements being particularly preferred. Gypsum can also be used as a hydraulically setting inorganic compound as such or in a mixture with the cement. Component (A) may also comprise silicatic, polycondensable compounds, in particular soluble, dissolved and/or amorphous silica-containing substances such as, for example, polar, non-after-treated fumed silica, as the polycondensable inorganic compound.

Furthermore, it is particularly preferred that the component (A) also contains a thixotropic agent, preferably fumed silica, wherein mixtures of different fumed silicas should also be included.

In a preferred embodiment, the reactive resin component (A) therefore contains:
- at least one urethane(meth)acrylate, as defined above;
- at least one inhibitor of the piperidinyl-N-oxyl or tetrahydropyrrole-N-oxyl type as defined above, preferably TEMPOL;
- at least one accelerator as defined above, preferably a toluidine derivative, particularly preferably di-iso-propanol-p-toluidine;
- at least one hydraulically setting or polycondensable inorganic compound, preferably cement; and
- at least one thixotropic agent, preferably fumed silica, and the hardener component (B) contains:
- at least one initiator for initiating the polymerization of the urethane (meth)acrylate, preferably benzoyl peroxide (BPO) or tert-butyl peroxybenzoate; and
- water.

In a more preferred embodiment, the reactive resin component (A) contains:
- at least one urethane(meth)acrylate, as defined above;
- at least one inhibitor of the piperidinyl-N-oxyl or tetrahydropyrrole-N-oxyl type as defined above, preferably TEMPOL;
- at least one accelerator, preferably a toluidine derivative, particularly preferably di-iso-propanol-p-toluidine;
- at least one hydraulically setting or polycondensable inorganic compound, preferably cement; and
- at least one thixotropic agent, preferably fumed silica, and the hardener component (B) contains:
- at least one initiator for initiating the polymerization of the urethane (meth)acrylate, preferably benzoyl peroxide (BPO) or tert-butyl peroxybenzoate;
- at least one filler, preferably quartz sand or quartz powder, and
- water.

In an even more preferred embodiment, the reactive resin component (A) contains:
- at least one urethane(meth)acrylate, as defined above;
- at least one inhibitor of the piperidinyl-N-oxyl or tetrahydropyrrole-N-oxyl type as defined above, preferably TEMPOL;
- at least one accelerator, preferably a toluidine derivative, particularly preferably di-iso-propanol-p-toluidine;
- at least one further inhibitor selected from the group consisting of catechols and phenothiazines;
- at least one hydraulically setting or polycondensable inorganic compound, preferably cement; and
- at least one thixotropic agent, preferably fumed silica, and the hardener component (B) contains:
- at least one initiator for initiating the polymerization of the urethane (meth)acrylate, preferably benzoyl peroxide (BPO) or tert-butyl peroxybenzoate;
- at least one filler, preferably quartz sand or quartz powder;
- at least one thixotropic agent, preferably fumed silica: and
- water.

In an even more preferred embodiment, the reactive resin component (A) contains:
- at least one urethane(meth)acrylate, as defined above;
- at least one inhibitor of the piperidinyl-N-oxyl or tetrahydropyrrole-N-oxyl type as defined above, preferably TEMPOL;
- at least one accelerator, preferably a toluidine derivative, particularly preferably di-iso-propanol-p-toluidine;
- at least one further inhibitor selected from the group consisting of catechols and phenothiazines;
- at least one hydraulically setting or polycondensable inorganic compound, preferably cement;
- at least one thixotropic agent, preferably fumed silica, and
- at least one further filler, preferably quartz sand, and the hardener component (B) contains:
- Benzoyl peroxide (BPO) or tert-butyl peroxybenzoate as an initiator for initiating the polymerization of the urethane(meth)acrylate;

at least one filler, preferably quartz sand or quartz powder;
at least one thixotropic agent, preferably fumed silica; and
water.

In an even more preferred embodiment, the reactive resin component (A) contains:
at least one urethane(meth)acrylate, as defined above;
TEMPOL;
di-iso-propanol-p-toluidine;
at least one further inhibitor selected from the group consisting of catechols and phenothiazines;
cement;
fumed silica; and
silica sand, and the hardener component (B) contains:
at least one initiator for initiating the polymerization of the urethane(meth)acrylate;
fumed silica;
quartz sand or quartz powder and
water.

In each of these embodiments, in a preferred embodiment the reactive resin component (A) additionally contains at least one reactive diluent. This reactive diluent is preferably a monomer or a mixture of a plurality of monomers of the backbone resin.

The reactive resin components (A) and the hardener components (B) in each of these embodiments can be combined with one another as desired.

In a particularly preferred embodiment, the constituents of the reactive resin or of the reactive resin component according to the invention are one or more of the constituents which are mentioned in the examples according to the invention. Very particular preference is given to reactive resins or reactive resin components which contain the same constituents or consist of the same constituents as are mentioned in the individual examples according to the invention, preferably in the proportions stated there.

The inventive reactive resin prepared according to the invention and the reactive resin component (A), which contains this reactive resin, and the reactive resin system according to the invention comprising this reactive resin component as a component are characterized by a particularly low reactivity drift, a particularly low gel time drift and good storage stability.

The reactivity drift and gel time drift, or one of these two characteristics, are less in the compositions of the present invention than in compositions with the same components that were prepared by adding the TEMPOL to the backbone resin immediately upon completion of the reaction.

The reactive resins produced according to the invention can be used in many fields in which unsaturated polyester resins, vinyl ester resins or vinyl ester urethane resins are otherwise conventionally used. They can be used in particular for the production of reactive resin mortars for structural applications, such as chemical fastening.

The reactive resin of the invention is usually used as a resin constituent in the reactive resin component of a multi-component system, typically a two-component system consisting of a reactive resin component (A) and a hardener component (B). This multi-component system may be in the form of a shell system, a cartridge system or a film pouch system. In the intended use of the system, the components are either ejected from the shells, cartridges or film pouches under the application of mechanical forces or by gas pressure, are mixed together, preferably by means of a static mixer through which the components are passed, and introduced into the borehole, whereafter the devices to be fastened, such as threaded rods of anchors and the like, are introduced into the borehole fed with the hardening reactive resin and adjusted accordingly.

Such a reactive resin system is used primarily in the construction sector, for example for the repair of concrete, as polymer concrete, as a coating material based on synthetic resin or as cold-curing road marking. It is particularly suitable for chemical fastening of anchoring means, such as anchors, rebar, screws and the like, in boreholes, in particular in boreholes in various substrates, in particular mineral substrates, such as those based on concrete, aerated concrete, brickwork, sand-lime brick, sandstone, natural stone, glass and the like, and metal substrates such as steel. In one embodiment, the substrate of the borehole is concrete, and the anchoring means is made of steel or iron. In another embodiment, the substrate of the borehole is steel, and the anchoring means is made of steel or iron.

Another object of the invention is the use of the reactive resin according to the invention as part of a curable binder or as a curable binder, in particular for fastening anchoring means in boreholes of different subsurfaces and for structural bonding. In one embodiment, the substrate of the borehole is concrete, and the anchoring means is made of steel or iron. In another embodiment, the substrate of the borehole is steel, and the anchoring means is made of steel or iron. Preferably, the steel borehole has grooves.

The invention is explained in more detail below with reference to a number of examples and FIGS. All examples and illustrations support the scope of the embodiments. However, the invention is not limited to the specific embodiments shown in the examples and FIGS.

EXAMPLES

All components of the compositions listed here are—unless stated otherwise—commercially available and were used in the commercially usual quality.

Measurement of Resin Reactivity

The reactivity period was measured. By this is meant the resin reactivity ($t_{r,25}$→80° C.) of a resin or a resinous composition expressed as the time from the time of addition of an initiator to initialize the cure to the time when the composition has reached a temperature of 80° C.

The measurement was as follows:

The reactivity time, i.e. the resin reactivity $t_{r,25}$→80° C. after addition of the initiator (for example Perkadox 20S in examples 1 and 2) to the resin or the resin-containing composition, was measured with a conventional instrument (Geltimer, WKS Informatik) at a starting temperature of 25° C. The mixture was filled after addition of the initiator to a height of 4 cm below the edge into a test tube, the test tube was kept at a temperature of 25° C. (DIN 16945, DIN EN ISO 9396). A glass rod or spindle was moved up and down at 10 strokes per minute in the mixture. The resin reactivity corresponds to the time after addition of the initiator, after which a temperature of 80° C. was measured in the mixture.

Measurement of the Gel Time

The gel time ($t_{m,25}$→35° C.) of a resin or a resin-containing composition was measured in terms of the time from the time of addition of an initiator to initialize the cure to the time when the composition has reached a temperature of 35° C. The measurement was as follows:

The gel time ($t_{m,25}$→35° C.) after addition of the initiator (for example, the hardener component described in example 3) to the resin-containing composition was determined with a conventional device (Geltimer, WKS Informatik) at a starting temperature of 25° C. The mixture was filled after addition of the initiator to a height of 4 cm below the edge into a test tube, the test tube was kept at a temperature of 25° C. (DIN 16945, DIN EN ISO 9396). A glass rod or spindle was moved up and down at 10 strokes per minute in the mixture. The gel time corresponds to the time after addition of the initiator, after which a temperature of 35° C. was measured in the mixture.

Example 1.1

A reactive resin master-batch containing a urethane methacrylate backbone resin was prepared by dropwise addition over a period of about 2.25 hours of 2.101 t of polymeric MDI (Desmodur 44V20L from Bayer) to 4.6347 t of HPMA (Visiomer HPMA 98 of U.S. patent from Evonik) under the action of a tin catalyst (0.016% by weight based on the final resulting reactive resin, TIB KAT 216, dioctyttin dilaurate from TIB Chemicals) and Phenothiazine D Prills (0.015 wt % based on the final resulting reactive resin, Allessa) and TEMPOL (0.02 wt % based on the final resulting reactive resin, Evonik) as process stabilizers, all prepared in the HPMA, prepared at a temperature of 65° C. to 75° C., and thereafter further stirred until its further addition with TEMPOL at 60° C.

Directly following this reaction for the preparation of the reactive resin, or 1 h, 3.25 h, 5 h or 23.5 h after completion of the reaction, the resulting reactive resin master-batch was treated with TEMPOL at 60° C. (0.31 wt. % based on the final resulting reactive resin) and stirred for 15 min for the preparation of the reactive resin. Subsequently, only di-iso-propanol-p-toluidine (1.8 wt. % based on the final resulting reactive resin) and catechol (0.15 wt. % based on the final resulting reactive resin) were added and solved while stirring for 30 min at constant temperature. Then, HPMA (25.27 wt % based on the final resulting reactive resin, Visiomer HPMA 98 from Evonik) and BDDMA (5.35 wt % based on the final resulting reactive resin, 1,4-butanediol dimethacrylate, Visiomer BDDMA, Evonik) were added. The entire reaction mixture was cooled while stirring to 30° C.±1° C.

50 g samples of the reactive resin thus prepared were heated for 45 minutes at 25° C. To measure the resin reactivity of these samples, the samples were each mixed at 25° C. with 15 g of Perkadox 20S (AkzoNobel) and the time $t_{m,25}\rightarrow 80°$ C. was measured until the curing mixture reached 80° C. The results are reproduced in Table 1.

TABLE 1

Prolongation of reactivity with time until TEMPOL addition

| Time to TEMPOL addition [h] | $t_{r, 25} \rightarrow 80°$ C. [min] |
|---|---|
| 0 | 6.8 |
| 1 | 7.2 |
| 3.25 | 7.7 |
| 5 | 7.8 |
| 23.5 | 7.9 |

It can be clearly seen that the reactivity duration $t_{r,25}\rightarrow 80°$ C. increases with increasing distance of the TEMPOL addition from the end of the reaction to the production of the backbone resin and that this increase has an asymptotic course.

Example 1.2

A reactive resin master-batch containing a urethane methacrylate backbone resin was prepared by dropwise addition over a period of about 2.25 hours of 2.101 t of polymeric MDI (Desmodur 44V20L from Bayer) to 4.6347 t of HPMA (Visiomer HPMA 98 of U.S. patent from Evonik) under the action of a tin catalyst (0.016% by weight based on the final resulting reactive resin, TIB KAT 216, dioctyltin dilaurate from TIB Chemicals) and Phenothiazine D Prills (0.015 wt % based on the final resulting reactive resin, Allessa) and TEMPOL (0.02 wt % based on the final resulting reactive resin, Evonik) as process stabilizers, all of which were initially fed into the HPMA, prepared at a temperature of 65° C. to 75° C. The resulting reactive resin master-batch was then further stirred at 75° C. until the further addition of TEMPOL.

1 h after completion of the reaction for the preparation of the backbone resin, the resulting reactive resin master-batch was treated with TEMPOL at 75° C. (0.31 wt. % based on the final resulting reactive resin) and stirred for 15 min. Subsequently, only di-iso-propanol-p-toluidine (1.8 wt. % based on the final resulting reactive resin) and catechol (0.15 wt. % based on the final resulting reactive resin) was added and dissolved for 30 min at constant temperature while stirring. Then, 1,4-BDDMA (5.35 wt % based on the final resulting reactive resin, Visiomer BDDMA from Evonik) and HPMA (25.27 wt % based on the final resulting reactive resin, Visiomer HPMA 98 from Evonik) were added. The entire reaction mixture was cooled while stirring to 30° C.±1° C. A 50 g sample of the reactive resin thus prepared was heated for 45 minutes at 25° C. The reactivity duration $t_{r,25}\rightarrow 80°$ C. of this sample was measured by curing with 15 g Perkadox 20S (AkzoNobel) and was 6.3 min.

The reactivity duration $t_{r,25}\rightarrow 80°$ C. was thus significantly reduced compared to the 1 h sample from example 1.1, which was otherwise treated identically, only because of the elevated temperature before and after the addition of TEMPOL. At elevated temperature presumably more TEMPOL is degraded in a shorter time, so that it comes to a shortening of the reactivity, which may be disadvantageous.

Example 2.1

A reactive resin master-batch containing a urethane methacrylate backbone resin was prepared by dropwise addition over a period of about 2.25 hours of 2.101 t of polymeric MDI (Desmodur 44V20L from Bayer) to 4.6347 t of HPMA (Visiomer HPMA 98 of U.S. patent from Evonik) under the action of a tin catalyst (0.016% by weight based on the final resulting reactive resin, TIB KAT 216, dioctyltin dilaurate from TIB Chemicals) and Phenothiazine D Prills (0.015 wt % based on the final resulting reactive resin, Allessa) and TEMPOL (0.02 wt % based on the final resulting reactive resin, Evonik) as process stabilizers, all of which were initially fed into the HPMA, prepared at a temperature of 65° C. to 75° C. The resulting reactive resin master-batch was further stirred then until its displacement with di-iso-propanol-p-toluidine at 60° C.

15 minutes after completion of the reaction to prepare the backbone resin, the reactive resin master-batch was treated at 60° C. with isopropanol-p-toluidine (1.8 wt. %, based on the finally resulting reactive resin) and then catechol (0.147 wt. % based on the final resulting reactive resin) and dissolved for 30 min at a constant temperature while stirring. After completion of the reaction, the mixture was stirred for a total of 45 minutes (post-reaction time) at 60° C. (post-reaction temperature). Then, 1,4-BDDMA (5.35 wt % based on the final resulting reactive resin, Visiomer BDDMA from Evonik) and HPMA (25.27 wt % based on the final resulting reactive resin, Visiomer HPMA 98 from Evonik) were added.

Subsequently, the entire reaction mixture was cooled to 30° C.±1° C. (duration of 2.25 h) while stirring. Then, TEMPOL (0.275 wt. % based on the final resulting reactive resin) was added. Thus, the TEMPOL addition was not until 3 hours after completion of the reaction for the preparation of the backbone resin. The TEMPOL was dissolved for 45 minutes while stirring, during which time the sample was slowly cooled to room temperature (25° C.). After the periods of time indicated in table 2 had elapsed after the room temperature had been reached, in each case a 50 g sample of the reactive resin thus prepared was heated at 25° C. for 45 minutes. The reactivity duration $t_{r,25} \rightarrow 80°$ C. of this sample was measured by curing with 15 g of Perkadox 20S (AkzoNobel). The results are reproduced in Table 2.

TABLE 2

Reactivity duration as a function of the elapsed time since reaching room temperature

| Time after the sample reached room temperature [d] | $t_{r,25} \rightarrow 80°$ C. [min] |
|---|---|
| 0.04 | 6.2 |
| 1 | 5.5 |
| 2 | 5.3 |
| 6 | 5.4 |

It can be seen that the reactivity duration $t_{r,25} \rightarrow 80°$ C. became smaller with increasing time since reaching the room temperature, i.e. a reactivity drift took place.

Example 2.2

A reactive resin master-batch containing a urethane methacrylate backbone resin was prepared by dropwise addition over a period of about 2.25 hours of 2.101 t of polymeric MDI (Desmodur 44V20L from Bayer) to 4.6347 t of HPMA (Visiomer HPMA 98 of U.S. patent from Evonik) under the action of a tin catalyst (0.016% by weight based on the final resulting reactive resin, TIB KAT 216, dioctyltin dilaurate from TIB Chemicals) and Phenothiazine D Prills (0.015 wt % based on the final resulting reactive resin, Allessa) and TEMPOL (0.02 wt % based on the final resulting reactive resin, Evonik) as process stabilizers, all of which were fed into the HPMA, prepared at a temperature from 85° C. to 105° C. The resulting reactive resin master-batch was further stirred then until its displacement with di-iso-propanol-p-toluidine at 85° C.

15 minutes after completion of the reaction to prepare the backbone resin, the reactive resin master-batch was treated at 85° C. with isopropanol-p-toluidine (1.8 wt. %, based on the finally resulting reactive resin) and then catechol (0.147 wt. % based on the final resulting reactive resin) and dissolved for 30 min at a constant temperature while stirring. After completion of the reaction, the mixture was stirred for a total of 45 minutes (post-reaction time) at 85° C. (after-reaction temperature). Subsequently, BDDMA (5.35 wt %, based on the final resulting reactive resin, Visiomer BDDMA from Evonik) and HPMA (25.27 wt %, based on the final resulting reactive resin, Visiomer HPMA 98 from Evonik) were added. Subsequently, the entire reaction mixture was cooled to 30° C.±1° C. (duration of 2.25 h) while stirring. Then, TEMPOL (0.275 wt. % based on the final resulting reactive resin) was added. Thus, the TEMPOL addition was not until 3 hours after completion of the reaction for the preparation of the backbone resin. The TEMPOL was dissolved with stirring for 45 minutes, during which the sample was slowly cooled to room temperature (25° C.). After the periods of time indicated in Table 3 had elapsed after the room temperature had been reached, a 50 g sample of the reactive resin thus prepared was tempered at 25° C. for 45 minutes. The reactivity duration $t_{r,25} \rightarrow 80°$ C. of this sample was measured by curing with 15 g of Perkadox 20S (AkzoNobel). The results are reproduced in Table 3.

TABLE 3

Reactivity duration as a function of the elapsed time since reaching room temperature

| Time after the sample reached room temperature [d] | $t_{r,25} \rightarrow 80°$ C. [min] |
|---|---|
| 0.04 | 6.4 |
| 0.08 | 6.2 |
| 0.71 | 6.2 |
| 1 | 6.1 |
| 5 | 6.1 |

It can be seen that the reactivity duration $t_{r,25} \rightarrow 80°$ C. was lower with increasing time since reaching room temperature. However, this reduction (reactivity drift) was much less pronounced than in Example 2.1, which is advantageous. This may be due to the higher manufacturing temperature of the backbone resin and/or the higher initial post-reaction temperature (i.e., the temperature at which the mixture is held after the completion of the reaction to the backbone resin). The resulting reactive resin master-batch is believed to contain fewer impurities that promote the rapid degradation of TEMPOL than the reactive resin master-batch in example 2.1

Example 3.1: Reference Method 1.848 t of HPMA (Visiomer HPMA 98 from Evonik) was initially fed into a 12 m³ reactor. For this purpose, the same process stabilizers and the same tin catalyst were added in the same amounts as in example 1.1 and the batch was heated to about 60° C. Thereafter, 837.6 kg of polymeric MDI (Desmodur 44V20L from Bayer) were added dropwise over a period of about 0.9 h while stirring. The temperature was maintained by cooling to a value of 65-75° C. After the dropwise addition, the batch was stirred at this temperature ("postreaction temperature") for about 45 minutes ("postreaction time"). Next, 12.4 kg (0.31 wt % based on the final resulting reactive resin) of TEMPOL (Evonik), then 72 kg of N,N-di-iso-propyltoluidine (Saltigo) followed by a 6 kg (0.15 wt %, based on the final resulting reactive resin) of catechol (Rhodia) were added and dissolved at this temperature. After the substances had been dissolved, 214 kg of 1,4-BDDMA (Visiomer BDDMA from Evonik) and then a further 1.008 t of HPMA (Visiomer HPMA 98 from Evonik) were added. As a result of the addition, the temperature of the reactor contents dropped to about 55° C. The batch was then actively cooled to room temperature (25° C.).

Example 3.2: Lowering the Post-Reaction Temperature and Prolonging the Post-Reaction Time Differences to the reference method from Example 3.1: Lowering of the post-reaction temperature from about 70° C. on average to about 60° C. on average and extending the post-reaction of 0.75 h (45 min) to 8 h.

69.29 kg of HPMA (Visiomer HPMA 98 from Evonik) was initially fed into a 300 kg reactor. For this purpose, the same process stabilizers and the same tin catalyst were added in the same amounts as in example 1.1 and the batch was heated to 80° C. Thereafter, 31.41 kg of polymeric MDI (Desmodur 44V20L from Bayer) were added dropwise over a period of about 70 minutes while stirring. The temperature was maintained by cooling to a value of about 70-75° C. After the dropwise addition, the batch was cooled to 60° C. (postreaction temperature) and stirred for about 8 hours (postreaction time) at a temperature of 58-62° C. After this time, 0.412 kg (0.275 wt % based on the final resulting reactive resin) of TEMPOL (Evonik), then, 2.7 kg of N,N-di-iso-propyltoluidine (Saltigo) and then 0.221 kg (0.147 wt %, based on the final resulting reactive resin) of catechol (Rhodia) were dissolved in the batch at this temperature. Next, 8.025 kg of 1,4-BDDMA (Visiomer BDDMA from Evonik) and then a further 37.874 kg of HPMA (Visiomer HPMA 98 from Evonik) were added. As a result of the addition, the temperature of the reactor contents dropped to about 48° C. The batch was then actively cooled to room temperature (25° C.).

Example 3.3: Increasing the Post-Reaction Temperature and Prolonging the Post-Reaction Time Differences to the reference method from Example 3.1: increasing the post-reaction temperature of about 70° C. on average to about 81° C. on average and extending the post-reaction of 0.75 h (45 min) to 6 h.

4.619 t of HPMA (Visiomer HPMA 98 from Evonik) was initially fed into a 12 m³ reactor. For this purpose, the same process stabilizers and the same tin catalyst were added in the same amounts as in example 1.1 and the batch was heated to about 60° C. Thereafter, 2.094 t of polymeric MDI (Desmodur 44V20L from Bayer) were added dropwise over a period of about 2.25 hours while stirring. The temperature was maintained by cooling to a value of 65-75° C. After the dropwise addition, the batch was stirred at 75-86° C. (post-reaction temperature) for 6 hours (post-reaction time). Next, 28 kg (0.28 wt % based on the final resulting reactive resin) of TEMPOL (Evonik), then 180 kg of N,N-di-iso-propyl-toluidine (Saltigo) and then 14.8 kg (0.148 wt %, based on the final resulting reactive resin) of catechol (from Rhodia) was added and dissolved at this temperature. After the substances had been dissolved, 535 kg of 1,4-BDDMA (Visiomer BDDMA from Evonik) were added and then another 2.542 t of HPMA (Visiomer HPMA 98 from Evonik). As a result of the addition, the temperature of the reactor contents dropped to about 62° C. The batch was then actively cooled to room temperature (25° C.).

Example 3.4: TEMPOL Addition Postponed by 3 h and at Reduced Temperature, Increasing the Maximum Synthesis Temperature, Increasing the Post-Reaction Temperature, Prolonging the Post-Reaction Time Differences to the reference method from Example 3.1: increasing the maximum synthesis temperature by about 30° C., increasing the post-reaction temperature of about 70° C. on average to about 95° C. and extending the post-reaction from 0.75 h (45 min) to 2.5 h, postponing the addition of TEMPOL by 3 hours and at a temperature of about 30° C. instead of at a temperature of about 60° C.

69.29 kg of HPMA (Visiomer HPMA 98 from Evonik) was initially fed into a 300 kg reactor. To this reactor, the same process stabilizers and the same tin catalyst were added in the same amounts as in example 1.1 and the batch was heated to 80° C. Thereafter, 31.41 kg of polymeric MDI (Desmodur 44V20L from Bayer) were added dropwise over a period of about 70 minutes while stirring. The temperature rose to 107° C. After the dropwise addition, the batch was stirred without active cooling for about 2.5 h. The temperature dropped to 100° C. in the first 30 minutes during this time. From this point on, the temperature dropped linearly from 100° C. to approx. 87° C. in the following 2 h. The post-reaction time is the time from the beginning of the temperature drop, i.e. 2.5 h. During this time, the temperature dropped from 107° C. to 87° C. The mean post-reaction temperature was 95° C. After this time, 2.7 kg of N,N-di-iso-propyltoluidine (Saltigo) was first solved and then 0.221 kg (0.147% by weight based on the final resulting reactive resin) of catechol (Rhodia) was solved in the approach at this temperature. Next, 8.025 kg of 1,4-BDDMA (Visiomer BDDMA from Evonik) were added and then a further 37.874 kg of HPMA were added (Visiomer HPMA 98 from Evonik). As a result of the addition, the temperature of the reactor contents dropped to 70° C. The batch was then actively cooled to 30° C., which took about 1 h to complete. After this time, 0.412 kg (0.275 wt % based on the final resulting reactive resin) TEMPOL (Evonik) were added and dissolved in the next 1.5 h at this temperature. Thereafter, the batch was cooled to room temperature (25° C.).

Example 3.5: TEMPOL Addition Postponed by 5 h and at Reduced Temperature, Increasing the Maximum Synthesis Temperature, Increasing the Post-Reaction Temperature, Prolonging the Post-Reaction Time Differences to the reference method from Example 3.1: increasing the maximum synthesis temperature by about 35° C., increasing the post-reaction temperature of about 70° C. on average to about 105° C. and extending the post-reaction from 0.75 h to 2.5 h, postponing the addition of TEMPOL by 5 hours and at a temperature of about 30° C. instead of at a temperature of about 60° C.

2.310 t of HPMA (Visiomer HPMA 98 from Evonik) was initially fed into a 12 m³ reactor. For this purpose, the same process stabilizers and the same tin catalyst were added in the same amounts as in example 1.1 and the batch was heated to about 60° C. Thereafter, 1.047 t of polymeric MDI (Desmodur 44V20L from Bayer) were added dropwise over a period of about 1.25 h while stirring. The temperature was kept at a value of 105-112° C. by cooling. After the dropwise addition, the batch was stirred at 100-110° C. (post-reaction temperature) for 2.5 h (post-reaction time). Then it was cooled to about 80° C. for 0.75 h. Then 267.5 kg of 1,4-BDDMA (Visiomer BDDMA from Evonik) and then another 1.262 t of HPMA (Visiomer HPMA 98 from Evonik) were added. As a result of the addition, the temperature of the reactor contents dropped to about 62° C. Next, 90 kg N,N-di-iso-propyttoluidine (Saltigo) and then 7.4 kg (0.148 wt % based on the final resulting reactive resin) of catechol (Rhodia) were dissolved at this temperature. The mixture was then actively cooled to 30° C. and 14 kg (0.28% by weight, based on the final resulting reactive resin) of TEMPOL (Evonik) were dissolved at this temperature. Thereafter, the batch was cooled to room temperature (25° C.).

Example 3.6: TEMPOL Addition Postponed by 5.5 h and at Reduced Temperature, Increasing the Maximum Synthesis Temperature, Increasing the Post-Reaction Temperature, Prolonging the Post-Reaction Time Differences to the reference method from Example 3.1: increasing the maximum synthesis temperature by about 35° C., increasing the post-reaction temperature of about 70° C. on average to about 110° C. and extending the post-reaction from 0.75 h to 2 h. postponing the addition of TEMPOL by 5.5 hours and at a temperature of about 30° C. instead of at a temperature of about 60° C.

4.619 t of HPMA (Visiomer HPMA 98 from Evonik) was initially fed into a 12 m³ reactor. For this purpose, the same process stabilizers and the same tin catalyst were added in the same amounts as in example 1.1 and the batch was heated to about 60° C. Thereafter, 2.094 t of polymeric MDI (Desmodur 44V20L from Bayer) were added dropwise over a period of about 2.25 hours while stirring. The temperature was maintained by cooling to a value of 110-112° C. After the dropwise addition, the batch was stirred at 110-112° C. (postreaction temperature) for 2 hours (postreaction time). It was then cooled to about 88° C. for 0.5 h. Next, 535 kg of 1,4-BDDMA (Visiomer BDDMA from Evonik) were added and then another 2.527 t of HPMA (Visiomer HPMA 98 from Evonik). As a result of the addition, the temperature of the reactor contents dropped to about 62° C. Next, 180 kg of N,N-di-iso-propyttoluidine (Saltigo) and then 14.6 kg (0.146 wt % based on the final resulting reactive resin) catechol (Rhodia) were dissolved at this temperature. The batch was then actively cooled to 30° C. and 25 kg (0.25 wt %, based on the final resulting reactive resin) of TEMPOL (Evonik) were dissolved at this temperature. Thereafter, the batch was cooled to room temperature (25° C.).

Example 3.7: TEMPOL Addition Postponed by 6 h and at Reduced Temperature, Increasing the Maximum Synthesis Temperature, Increasing the Post-Reaction Temperature, Prolonging the Post-Reaction Time Differences to the reference method from Example 3.1: increasing the maximum synthesis temperature by about 35° C., increasing the post-reaction temperature of about 70° C. on average to about 108° C. and extending the post-reaction from 0.75 h (45 min) to 2.5 h, postponing the addition of TEMPOL by 6 hours and at a temperature of about 30° C. instead of at a temperature of about 60° C.

4.619 t of HPMA (Visiomer HPMA 98 from Evonik) was initially fed into a 12 m³ reactor. For this purpose, the same process stabilizers and the same tin catalyst were added in the same amounts as in example 1.1 and the batch was heated to about 60° C. Thereafter, over a period of about 2.25 h while stirring 2.094 t polymeric MDI (Desmodur 44V20L from Bayer) was added dropwise. The temperature was maintained by cooling to a value of 110-112° C. After the dropwise addition, the batch was stirred at 108-112° C. (post-reaction temperature) for 2.5 hours (post-reaction time). Then it was cooled to about 85° C. for 0.5 h. Next, 535 kg of 1,4-BDDMA (Visiomer BDDMA from Evonik) were added and then another 2.527 t of HPMA (Visiomer HPMA 98 from Evonik). As a result of the addition, the temperature of the reactor contents dropped to about 60° C. Next, 180 kg of N,N-di-iso-propyltoluidine (Saltigo) and then 14.6 kg (0.146 wt % based on the final resulting reactive resin) catechol (Rhodia) were dissolved at this temperature. The batch was then actively cooled to 30° C. and 25 kg (0.25 wt %, based on the final resulting reactive resin) of TEMPOL (Evonik) were dissolved at this temperature. Thereafter, the batch was cooled to room temperature (25° C.).

Example 3.8: Further Processing of Reactive Resins and Measurement of Gel Times Each of the reactive resins prepared in Examples 3.1 to 3.7 (each at 43 wt. %) was treated with sand (Strobel; P10, 36 wt. %), cement (Kemeos Inc.; Secar 80, 18 wt. %) and fumed silica (Cabot, TS-720, 3 wt. %), homogenized to a thixotropic reactive resin component and packed in film. This packaged reactive resin component was combined with a dibenzoyl peroxide-containing hardener component likewise packed in film (hardener component of the hybrid injection mortar HIT MM Plus from HILTI) to form a film package. The two components were mixed by means of a static mixer and a dispenser, and thereby the radical curing was started. In this case, from the mixture of the components, which were previously heated to a temperature of 25° C. the curing was delayed by the inhibitors contained in the resin TEMPOL and catechol. The length of this delay depends on the amount of these inhibitors (still present) at the time of the radical curing. The production process according to the invention for the reactive resin has an effect on this amount, and thus also on the gel time, as well as the storage life of the film pack and the storage temperature. In order to determine the shortening of the gel time during storage (hereinafter referred to as gel time drift), film packs were stored for a certain duration at 23° C. or 40° C. and cured after this time, as described above. The gel time was determined as described above by means of a gel timer, which records the thermal history of the curing reaction. The film packs tempered at 25° C. were mixed with a likewise tempered static mixer in a bath tempered to 25° C. The time at which the mixture of components exceeded a temperature of 35° C. is called gel time and is abbreviated as follows: $t_{m,25} \rightarrow 35°$ C.

The differences between examples 3.1 to 3.7 are summarized in Table 4. The effect of these differences on gel time is shown in FIGS. 1 and 2 (FIG. 1: Storage at 23° C.; FIG. 2: Storage at 40° C.).

TABLE 4

Summary of the differences between Examples 3.1 to 3.7

| Example | Produced amount of reactive resin [t] | Amount of TEMPOL [wt. %] | Amount of catechol [wt. %] | Reaction time [h] | Synthesis maximum temperature [° C.] | Post reaction period [h] | Average post-reaction temperature [° C.] |
|---|---|---|---|---|---|---|---|
| 3.1 | 4 | 0.31 | 0.15 | 0.9 | 75 | 0.75 | 70 |
| 3.2 | 0.15 | 0.275 | 0.147 | 1.17 | 75 | 8 | 60 |
| 3.3 | 10 | 0.28 | 0.148 | 2.25 | 75 | 6 | 81 |

TABLE 4-continued

Summary of the differences between Examples 3.1 to 3.7

| Example | Produced amount of reactive resin [t] | Amount of TEMPOL [wt. %] | Amount of catechol [wt. %] | Reaction time [h] | Synthesis maximum temperature [° C.] | Post reaction period [h] | Average post-reaction temperature [° C.] |
|---|---|---|---|---|---|---|---|
| 3.4 | 0.15 | 0.275 | 0.147 | 1.17 | 107 | 2.5 | 95 |
| 3.5 | 5 | 0.28 | 0.148 | 1.25 | 112 | 2.5 | 105 |
| 3.6 | 10 | 0.25 | 0.146 | 2.25 | 112 | 2 | 110 |
| 3.7 | 10 | 0.25 | 0.146 | 2.25 | 112 | 2.5 | 108 |

As can be seen from the graphs in FIGS. 1 and 2, an extension of the post-reaction time and reduction of the post-reaction temperature (example 3.2 compared to 3.1) hardly results in an extension of the gel time in correlation with the storage time. On the other hand, a clear prolongation can be recognized even at an increase in the average post-reaction temperature to 81° C., as shown in example 3.3. However, if the synthesis maximum temperature is raised above 100° C. and the post-reaction temperature again to about 95° C., as in example 3.4, it is possible to significantly improve the gel time drift despite massive shortening of the post-reaction time and thus a significantly more cost-effective production. By increasing the maximum synthesis temperature, the reaction time, and the post-reaction temperature, the gel time drift is greatly improved (examples 3.6 and 3.7 compared to examples 3.1 to 3.5), despite significantly reduced inhibitor concentration (see, for example, the inhibitor concentration of example 3.7 with 3.1).

Example 4.1: Reference Method for the Preparation of the Reference Reactive Resin Having a Maximum Synthesis Temperature of 80° C.

A reactive resin master-batch containing a urethane methactylate backbone resin was prepared by the dropwise addition of 17.99 kg polymeric diphenylmethane diisocyanate (pMDI; Desmodur VL R20 from Covestro) to 79.36 kg of HPMA (HPMA Visiomer 98 from Evonik), 34 g of TEMPOL (Evonik), 8 g of phenothiazine (D Prills, Allessa) and 12 g of Tegokat 216 (TIB KAT 216, dioctyltin dilaurate from the company TIB Chemicals) at a temperature of 75° C. while stirring. During the dropwise addition, the temperature rose and was maintained at 80° C. until completion of the reaction (about 1.5-2 hours, control by titration of the NCO groups).

After completion of the reaction (about 1.5-2 h), the resulting reactive resin master-batch was cooled to 60° C. and treated with a further 74 g TEMPOL (Evonik) and stirred for 15 min for the preparation of the reactive resin. Subsequently, 2.5 kg of di-iso-propanol-p-toluidine (Saltigo), 834 g of N-(2-hydroxyethyl)-N-methyl-p-toluidine (Saltigo), 130 g of tert-Butylbrenzcatechin (TBC 100% flakes, Rhodia) and 519 g of catechol (Rhodia) were added and dissolved for 30 min with stirring at constant temperature. Subsequently, 74.3 kg of BDDMA (Visiomer BDDMA from Evonik) were added. The entire reaction was cooled to room temperature (30° C.±1° C.) while stirring.

The stirring speed is chosen in each case according to the reactor used or the equipment used so that a maximum possible mixing and thus a maximum turnover are possible.

Example 4.2: Reference Method for the Preparation of the Reference Reactive Resin Having a Maximum Synthesis Temperature of 95° C.

A reactive resin master-batch containing a urethane methactylate backbone resin was prepared by the dropwise addition of 17.99 kg polymeric diphenylmethane diisocyanate (pMDI; Desmodur® VL R20 from Covestro) to 79.36 kg of HPMA (HPMA Visiomer 98 from Evonik), 34 g of TEMPOL (Evonik), 8 g of phenothiazine (D Prills, Allessa) and 12 g of Tegokat 216 (TIB KAT® 216, dioctytin dilaurate from the company TIB Chemicals) at a temperature of 75° C. while stirring. During the dropwise addition and until completion of the reaction (about 1.5 h-2 h, control by titration), the temperature was kept at 95° C.

After completion of the reaction, the resulting reactive resin master-batch was cooled to 60° C. and treated with a further 74 g of TEMPOL (Evonik) and stirred for 15 min for the preparation of the reactive resin. Subsequently, 2.5 kg of di-iso-propanol-p-toluidine (Saltigo), 834 g of N-(2-hydroxyethyl)-N-methyl-p-toluidine (Saltigo), 130 g of tert-Butylbrenzcatechin (TBC 100% flakes, Rhodia) and 519 g of catechol (Rhodia) were added and dissolved for 30 min with stirring at constant temperature. Subsequently, 74.3 kg of BDDMA (Visiomer BDDMA from Evonik) were added. The entire reaction was cooled to room temperature (30° C.±1° C.) while stirring.

The stirring speed is chosen in each case according to the reactor used or the equipment used so that a maximum possible mixing and thus a maximum turnover are possible.

Example 4.3: Increasing the Maximum Synthesis Temperature to 100° C.

Differences to the reference method from Example 4.1 or Example 4.2: increasing the maximum synthesis temperature to approx. 100° C.

A reactive resin master-batch containing a urethane methactylate backbone resin was prepared by the dropwise addition of 17.99 kg polymeric diphenylmethane diisocyanate (pMDI; Desmodur VL R20 from Covestro) to 79.36 kg of HPMA (HPMA Visiomer 98 from Evonik), 34 g of TEMPOL (Evonik), 8 g of phenothiazine (D Prills, Allessa) and 12 g of Tegokat 216 (TIB KAT® 216, dioctytin dilaurate from the company TIB Chemicals) at a temperature of 75° C. while stirring. During the dropwise addition and until completion of the reaction (about 1.5 h-2 h, control by titration), the temperature was kept at 100° C.

After completion of the reaction, the resulting reactive resin master-batch was cooled to 60° C. and treated with a further 74 g TEMPOL and stirred for 15 min for the preparation of the reactive resin. Subsequently, 2.5 kg of di-iso-propanol-p-toluidine (Saltigo), 834 g of N-(2-hydroxyethyl)-N-methyl-p-toluidine (Saltigo), 130 g of tert- Butylbrenzcatechin (TBC 100% flakes. Rhodia) and 519 g of catechol (Rhodia) were added and dissolved for 30 min with stirring at constant temperature. Subsequently, 74.3 kg of BDDMA (Visiomer BDDMA from Evonik) were added. The entire reaction was cooled to room temperature (30° C.±1° C.) while stirring.

The stirring speed is chosen in each case according to the reactor used or the equipment used so that a maximum possible mixing and thus a maximum turnover are possible.

Example 4.4: Increasing the Maximum Synthesis Temperature to 110° C.

Differences to the reference method from Example 4.1 or Example 4.2: increasing the maximum synthesis temperature to approx. 110° C.

A reactive resin master-batch containing a urethane methactylate backbone resin was prepared by the dropwise addition of 17.99 kg polymeric diphenylmethane diisocyanate (pMDI; Desmodur VL R20 from Covestro) to 79.36 kg of HPMA (HPMA Visiomer 98 from Evonik), 34 g of TEMPOL (Evonik), 8 g of phenothiazine (D Prills, Allessa) and 12 g of Tegokat 216 (TIB KAT® 216, dioctyltin dilaurate from the company TIB Chemicals) at a temperature of 75° C. while stirring. During the dropwise addition and until completion of the reaction (about 1.5 h-2 h, control by titration), the temperature was kept at 110° C.

After completion of the reaction, the resulting reactive resin master-batch was cooled to 60° C. and treated with a further 74 g TEMPOL and stirred for 15 min for the preparation of the reactive resin. Subsequently, 2.5 kg of di-iso-propanol-p-toluidine (Saltigo), 834 g of N-(2-hydroxyethyl)-N-methyl-p-toluidine (Saltigo), 130 g of tert-Butylbrenzcatechin (TBC 100% flakes, Rhodia) and 519 g of catechol (Rhodia) were added and dissolved for 30 min with stirring at constant temperature. Subsequently, 74.3 kg of BDDMA (Visiomer BDDMA from Evonik) were added. The entire reaction was cooled to room temperature (30° C.±1° C.) while stirring.

The stirring speed is chosen in each case according to the reactor used or the equipment used so that a maximum possible mixing and thus a maximum turnover are possible.

Example 4.5: Increasing the Maximum Synthesis Temperature to 120° C.

Differences to the reference method from Example 4.1: increasing the maximum synthesis temperature to approx. 120° C.

A reactive resin master-batch containing a urethane methactylate backbone resin was prepared by the dropwise addition of 17.99 kg polymeric diphenylmethane diisocyanate (pMDI; Desmodur® VL R20 from Covestro) to 79.36 kg of HPMA (HPMA Visiomer 98 from Evonik), 34 g of TEMPOL (Evonik), 8 g of phenothiazine (D Prills, Allessa) and 12 g of Tegokat 216 (TIB KAT® 216, dioctyltin dilaurate from the company TIB Chemicals) at a temperature of 75° C. while stirring. During the dropwise addition and until completion of the reaction (about 1.5 h-2 h, control by titration), the temperature was kept at 120° C.

After completion of the reaction, the resulting reactive resin master-batch was cooled to 60° C. and treated with a further 74 g TEMPOL and stirred for 15 min for the preparation of the reactive resin. Subsequently, 2.5 kg of di-iso-propanol-p-toluidine (Saltigo), 834 g of N-(2-hydroxyethyl)-N-methyl-p-toluidine (Saltigo), 130 g of tert-Butylbrenzcatechin (TBC 100% flakes, Rhodia) and 519 g of catechol (Rhodia) were added and dissolved for 30 min with stirring at constant temperature. Subsequently, 74.3 kg of BDDMA (Visiomer BDDMA from Evonik) were added. The entire reaction was cooled to room temperature (30° C.±1° C.) while stirring.

The stirring speed is chosen in each case according to the reactor used or the equipment used so that a maximum possible mixing and thus a maximum turnover are possible.

Example 4.6: Further Processing of the Reactive Resins to the Reactive Resin Components 4.6 to 4.10

Each of the reactive resins prepared in Examples 4.1 to 4.5 (each at 43 wt. %) was homogenized with sand (Strobel; P10, 36 wt. %), cement (Kemeos Inc, Secar 80, 18 wt. %) and fumed silica (Cabot, TS-720, 3 wt. %) to a thixotropic reactive resin component, whereby the reactive resin component 4.6 (from reactive resin 4.1), 4.7 (from reactive resin 4.2), 4.8 (from reactive resin 4.3), 4.9 (from reactive resin 4.4) and 4.10 (from reactive resin 4.5) were obtained.

Determination of Storage Stability

The storage stability of the reactive resins from examples 4.1 to 4.5 and of the reactive resin components 4.6 to 4.10 was determined. To determine the storage stability, in each case, 20 ml of the reactive resins, which were prepared in examples 4.1 to 4.5, and of the reactive resin components, prepared in examples 4.6 to 4.10, were filled into an aluminum-coated, oxygen-tight film (dimension: 12×5 cm) and the film was sealed, with as little air as possible remaining inside the film. The films were each stored at 80° C.

The storage stability was determined over the time to which the samples began to gel. This was haptically determined by feeling and pressing the samples daily in order to assess their consistency.

In each case, a freshly prepared reactive resin filled in films and a freshly prepared reactive resin component filled in a film served as comparison, the haptics of which were defined as liquid. Both films are stored at room temperature and were used in the assessment of the haptics of the films stored at 80° C. for each assessment as a comparison. These filled films are also referred to as comparative films.

The reactive resins and reactive resin components are considered to be stable in storage for as long as the haptics of the films after storage for a certain period of time at 80° C. are not different from those of the comparative films. The timing of gelation is defined as the time at which the haptics of the films change noticeably, i.e. the contents of the films no longer feel liquid. For the films filled with the reactive resins, gelation manifests itself as a significant increase in viscosity, causing the contents of the films to feel jam or honey-like. For the films filled with the reactive resin components, this manifests itself in a solidifying/curing of the composition, which felt almost firm.

If the determination was not clear, the film pouches were opened and their condition (liquid or gelled) assessed visually or by means of a viscosity measurement. The results are summarized in Table 5.

TABLE 5

Results of the determination of the storage stability of reactive resins and reactive resin components at different maximum synthesis temperatures

| Synthesis temperature, ° C. | 80 | 95 | 100 | 110 | 120 |
|---|---|---|---|---|---|
| Reactive resin | 4.1 | 4.2 | 4.3 | 4.4 | 4.5 |
| Storage h at 80° C. until gelled | 31-47 | 169-184 | >300 | >300 | >300 |
| Reactive resin component | 4.6 | 4.7 | 4.8 | 4.9 | 4.10 |
| Storage h at 80° C. until gelled | 31-47 | >300 | >300 | >300 | >300 |

As can be seen from the data, an increased maximum synthesis temperature has a significant influence on the storage stability of both the reactive resins and the reactive resin components prepared therefrom. The increase in the maximum synthesis temperature of 80° C. to 100° C. resulted in a significant increase in the storage stability of the reactive resin and the reactive resin component, wherein the assessment was terminated after each 300 hours (13 days). These results show that even raising the maximum synthesis temperature to at least 100° C. without an additional post-reaction leads to a marked improvement in the storage stability of a reactive resin and a reactive resin component prepared therefrom.

Figure 1A:
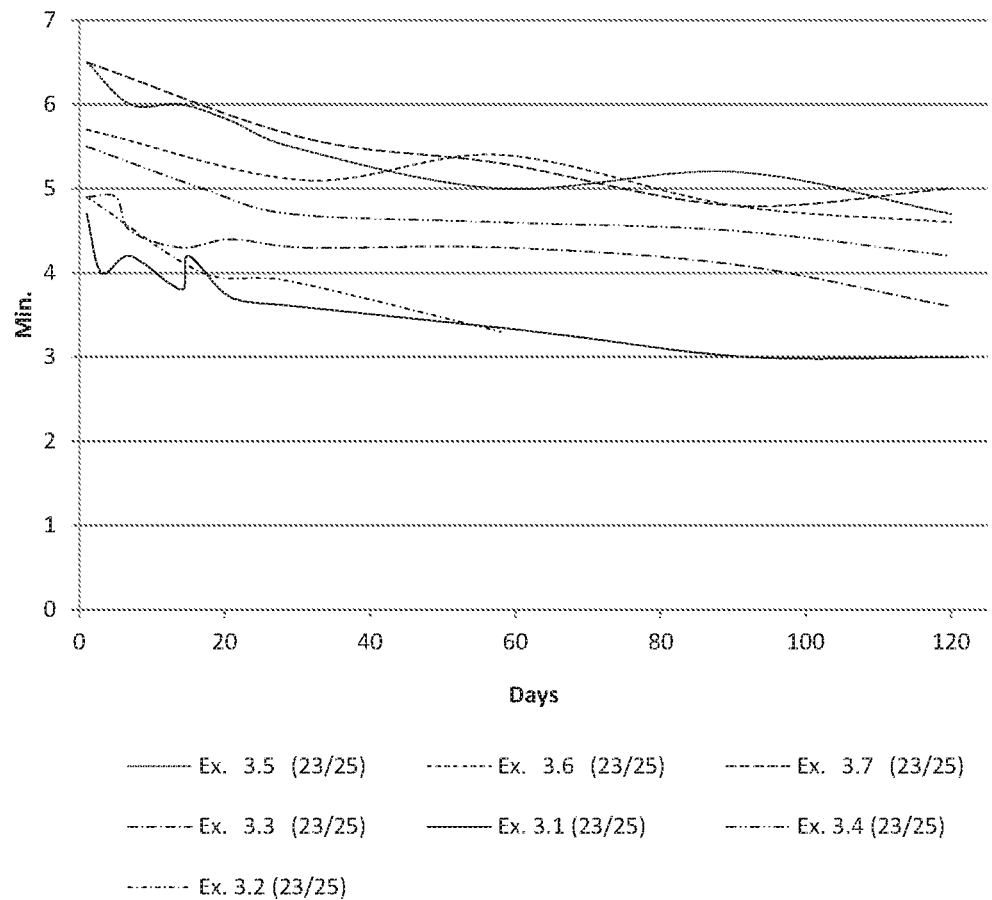
FIG. 1a shows the gel time values $t_{m,25}\rightarrow 35°$ C. measured in example 3.8 after storage at 23° C., plotted against the storage time in days. The inherent scattering of the measuring apparatus leads to scattering values and thus to the waveform of the curves shown.
Figure 1B:
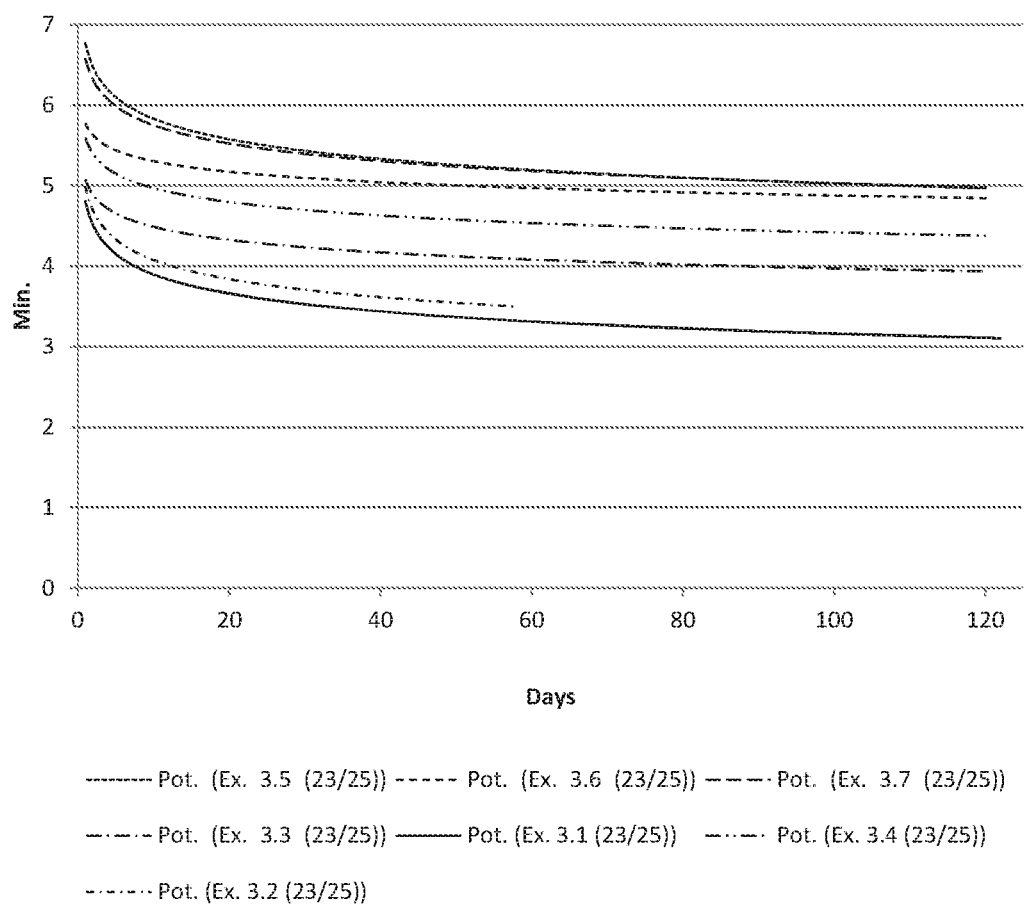
FIG. 1b shows the corresponding compensation curves to the curves of FIG. 1a to make the course of the curves of FIG. 1a clearer. Key of FIGS. 1a and b: "Pot."=Balance curve; "23/25"=23° C. storage temperature, 25° C. starting temperature of the gel time measurement; Min.=gel time in minutes; Days=storage duration in days.
Figure 2A:
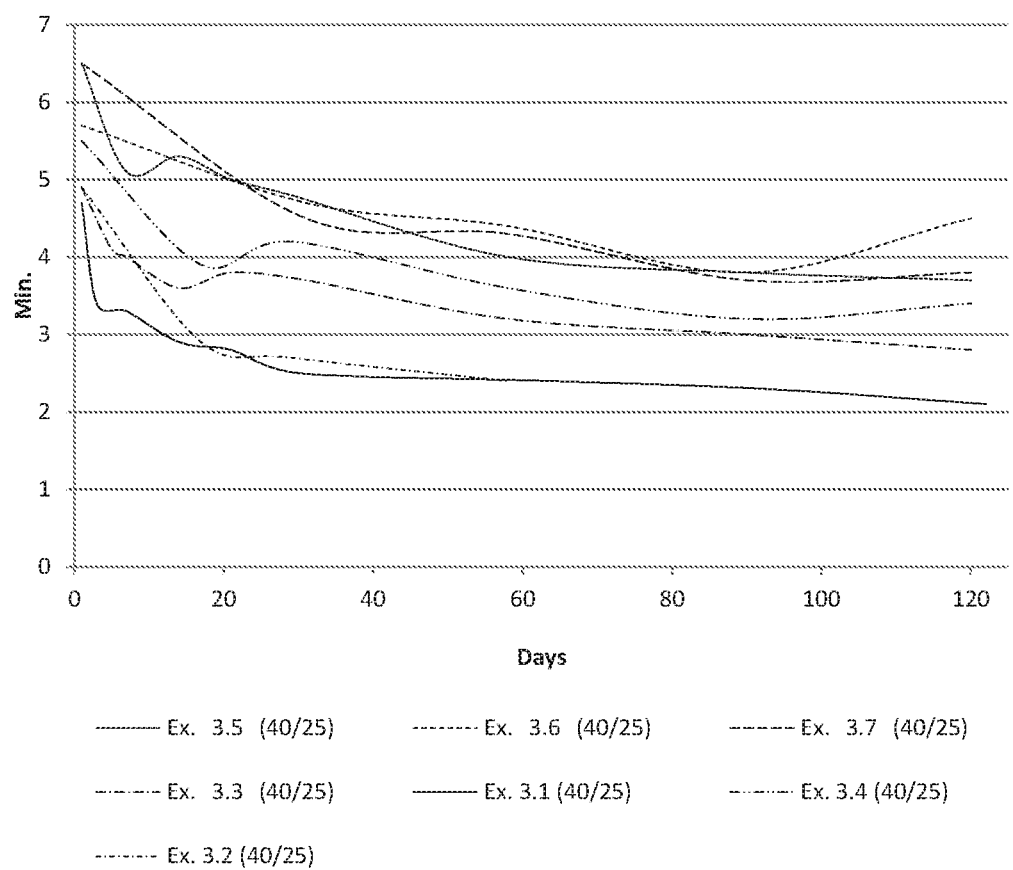
FIG. 2a shows the gel time values $t_{m,25}\rightarrow 35°$ C. measured in Example 3.8 after storage at 40° C., plotted against the storage time in days. Here, too, the inherent scattering of the measuring apparatus causes scattering values and thus a waveform of the curves.
Figure 2B:
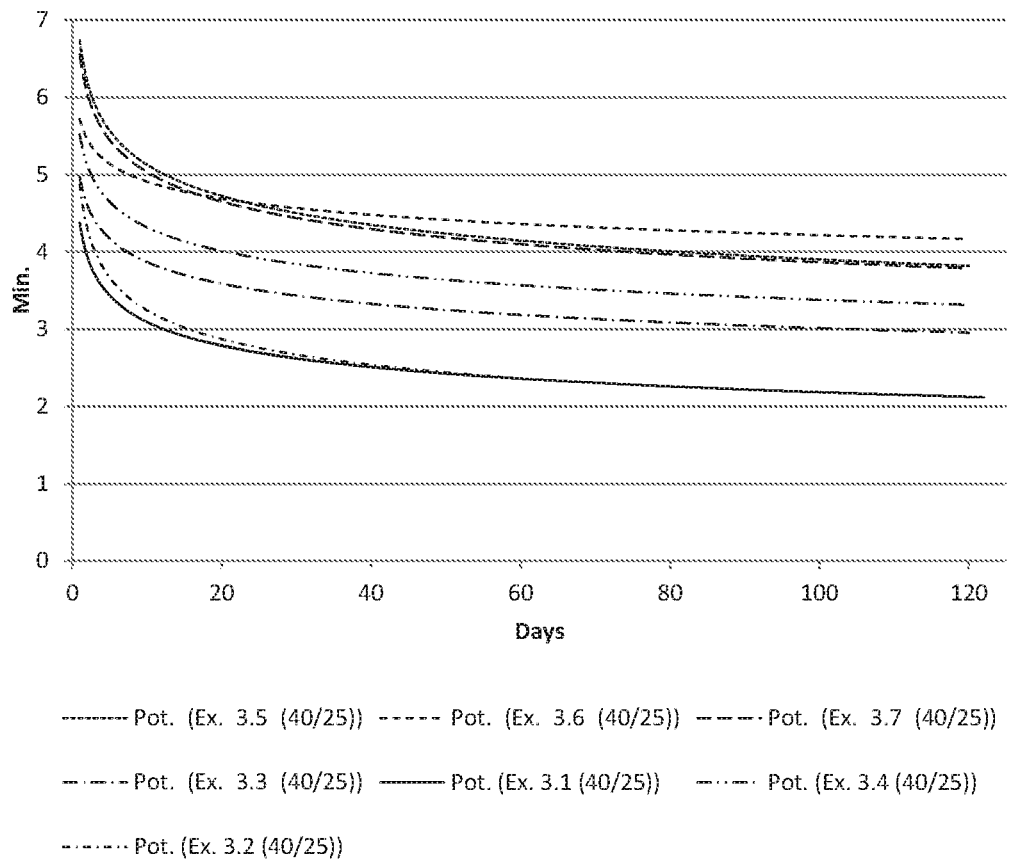
FIG. 2b shows the corresponding compensation curves to the curves of FIG. 2a to make the course of the curves of FIG. 2a dearer. Key of FIGS. 2a and b: "Pot."=Balance curve; "40/25"=40° C. storage temperature, 25° C. initial temperature of the gel time measurement; Min.=Gel time in minutes; Days=storage duration in days.

The invention claimed is:

1. A method for preparation of a reactive resin, the method comprising:
   (a) reacting at least one isocyanate, which is a polymeric methylene diphenyl diisocyanate (pMDI) composition, and at least one hydroxy-functionalized (meth)acrylate over a period t1 at a temperature T1 to obtain at least one backbone resin, which is a urethane(meth)acrylate resin, thereby producing a reactive resin master-batch;
   (b) immediately following completion of the reaction to obtain the at least one backbone resin, stirring the reactive resin master-batch resulting from (a), containing the at least one backbone resin, over a period t2 of about 0.5 h or more at a temperature T2;
   (c) after completion of the period t2, adding at least one inhibitor, wherein the at least one inhibitor is a piperidinyl-N-oxyl, a tetrahydropyrrole-N-oxyl, or a mixture thereof, and wherein the at least one inhibitor is added either:
      (i) immediately after the completion of the period t2 at the temperature T2 or
      (ii) after cooling of the mixture resulting from (b) to a temperature T3 after the expiration of a period t3, the period t3 starting from the end of the period t2; and
   (d) adding at least one accelerator and optionally at least one reactive diluent before, simultaneously with, or after the addition of the at least one inhibitor to obtain the reactive resin,
   wherein T1 is a maximum of at least 100° C.

2. The method of claim 1, wherein said at least one inhibitor is 4-hydroxy-2,2,6,6-tetramethylpiperidine-N-oxyl (TEMPOL).

3. The method of claim 1, wherein the hydroxy-functionalized (meth)acrylate is a hydroxy-functionalized methacrylate and the urethane(meth)acrylate resin is a urethane methacrylate resin.

4. The method of claim 3, wherein the hydroxy-functionalized methacrylate is at least one selected from the group consisting of hydroxyethyl methacrylate, 2-hydroxypropyl methacrylate, 3-hydroxypropyl methacrylate, 2-hydroxybutyl methacrylate, 3-hydroxybutyl methacrylate, 2-hydroxycyclohexyl methacrylate, glycerol-1,3-dimethacrylate, glycerol methacrylate, and mixtures thereof.

5. The method of claim 4, wherein the hydroxy-functionalized methacrylate is at least one selected from the group consisting of 2-hydroxypropyl methacrylate, 3-hydroxypropyl methacrylate, and a mixture of 2-hydroxypropyl methacrylate and 3-hydroxypropyl methacrylate.

6. The method of claim 1, wherein the temperature T2 is from about 100° C. to about 120° C.

7. The method according to claim 1, wherein the period t2 is from about 1.5 h to about 3 h.

8. The method according to claim 1, wherein a product of the period t2 multiplied by the temperature T2, expressed in h times ° C. (h° C.), is from 200 to 300 h° C.

9. A reactive resin, wherein the reactive resin is prepared by the method according to claim 1 and has a storage time until gelling at 80° C. of >300 h.

10. A reactive resin component (A) for a reactive resin system, wherein the reactive resin component (A) contains the reactive resin according to claim 9.

11. A reactive resin system, comprising:
   the reactive resin component (A) according to claim 10; and
   a hardener component (B) containing an initiator.

12. The reactive resin system according to claim 11, wherein at least one of the components (A) or (B) contains an inorganic filler.

13. The reactive resin system according to claim 11, wherein
   the reactive resin component (A) contains:
      at least one urethane(meth)acrylate made of at least one hydroxy-functionalized (meth)acrylate and a pMDI composition;
      at least one reactive diluent;
      at least one accelerator;
      at least TEMPOL as an inhibitor of the piperidinyl-N-oxyl- or tetrahydropyrrole-N-oxyl-type;
      at least one hydraulically setting or polycondensable inorganic compound; and
      at least one thixotropic agent, and the hardener component (B) contains:
- at least one initiator for the at least one urethane(meth)acrylate;
- at least one filler; and
- water.

14. The reactive resin system according to claim 11, wherein
the reactive resin component (A) contains:
- at least one urethane(meth)acrylate;
- TEMPOL;
- di-iso-propanol-p-toluidine;
- at least one further inhibitor selected from the group consisting of catechols and phenothiazines;
- cement;
- fumed silica; and
- silica sand, and the hardener component (B) contains:
- at least one initiator for initiating the polymerization of the urethane(meth)acrylate;
- fumed silica;
- quartz sand; and
- water.

15. A method for chemical fastening or structural bonding, the method comprising:
mixing and applying the reactive resin system according to claim 11 to an anchor in a borehole or to a structure.

16. The method according to claim 1, wherein the temperature T3 ranges from about 20° C. to about 90° C.

17. The method according to claim 1, wherein the period t3 ranges from about 0.5 h to about 24 h.

* * * * *